United States Patent
Bae et al.

(10) Patent No.: US 12,207,252 B2
(45) Date of Patent: Jan. 21, 2025

(54) METHOD FOR MONITORING UPLINK CANCELLATION INSTRUCTION, USER EQUIPMENT, APPARATUS, COMPUTER-READABLE STORAGE MEDIUM, METHOD FOR TRANSMITTING UPLINK CANCELLATION INSTRUCTION, AND BASE STATION

(71) Applicant: LG ELECTRONICS INC., Seoul (KR)

(72) Inventors: Duckhyun Bae, Seoul (KR); Joonkui Ahn, Seoul (KR); Hyunho Lee, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/766,212

(22) PCT Filed: Oct. 5, 2020

(86) PCT No.: PCT/KR2020/013453
§ 371 (c)(1),
(2) Date: Apr. 1, 2022

(87) PCT Pub. No.: WO2021/066596
PCT Pub. Date: Apr. 8, 2021

(65) Prior Publication Data
US 2024/0073887 A1    Feb. 29, 2024

Related U.S. Application Data

(60) Provisional application No. 63/011,194, filed on Apr. 16, 2020, provisional application No. 62/938,309, (Continued)

(30) Foreign Application Priority Data

Oct. 4, 2019   (KR) .................. 10-2019-0122825
Nov. 8, 2019   (KR) .................. 10-2019-0143044

(51) Int. Cl.
*H04W 72/1268*   (2023.01)
*H04L 5/00*   (2006.01)
(Continued)

(52) U.S. Cl.
CPC ....... *H04W 72/1268* (2013.01); *H04L 5/0053* (2013.01); *H04W 72/0446* (2013.01);
(Continued)

(58) Field of Classification Search
CPC ......... H04W 72/20–232; H04W 72/51; H04W 72/512; H04W 72/56–569; H04L 5/0048–0053; H04L 5/0091–0098
See application file for complete search history.

(56) References Cited

U.S. PATENT DOCUMENTS 10,979,976 B1 *   4/2021   Babaei .............. H04W 76/11
11,212,821 B2 *  12/2021   Jung ................ H04L 1/1854
(Continued)

FOREIGN PATENT DOCUMENTS

CN    109217989    1/2019
CN    110214430    9/2019
(Continued)

OTHER PUBLICATIONS

PCT International Application No. PCT/KR2020/013453, International Search Report dated Jan. 22, 2021, 3 pages.
(Continued)

*Primary Examiner* — Brendan Y Higa
(74) *Attorney, Agent, or Firm* — LEE, HONG, DEGERMAN, KANG & WAIMEY

(57) ABSTRACT

A UE may: receive a configuration regarding a physical downlink control channel (PDCCH) monitoring occasion (MO) for UL CI reception; receive scheduling information for UL transmission; and perform or skip UL CI monitoring for the UL transmission in the PDCCH MO on the basis of (Continued)

the configuration and the scheduling information. Performing or skipping the UL CI monitoring for the UL transmission in the PDCCH MO may comprise: performing the UL CI monitoring for the UL transmission in the PDCCH MO on the basis of the fact that the UL transmission and a reference resource region that may be instructed by a UL CI received in the PDCCH MO overlap at least in terms of time; and skipping the UL CI monitoring for the UL transmission in the PDCCH MO on the basis of the fact that the reference resource region and the UL transmission do not overlap in terms of time.

15 Claims, 10 Drawing Sheets

Related U.S. Application Data filed on Nov. 20, 2019, provisional application No. 62/912,024, filed on Oct. 7, 2019.

(51) Int. Cl.
*H04W 72/0446* (2023.01)
*H04W 72/21* (2023.01)
*H04W 72/50* (2023.01)
*H04W 72/566* (2023.01)
*H04W 72/23* (2023.01)

(52) U.S. Cl.
CPC ......... *H04W 72/21* (2023.01); *H04W 72/535* (2023.01); *H04W 72/569* (2023.01); *H04W 72/23* (2023.01)

(56) References Cited

U.S. PATENT DOCUMENTS

| | | | | |
|---|---|---|---|---|
| 11,419,123 | B2* | 8/2022 | Fakoorian | H04W 72/23 |
| 2007/0066333 | A1* | 3/2007 | Chen | H04W 72/30 |
| | | | | 455/518 |
| 2020/0229202 | A1* | 7/2020 | Bagheri | H04L 25/0226 |
| 2020/0322971 | A1* | 10/2020 | Jung | H04W 72/569 |
| 2020/0389876 | A1* | 12/2020 | Islam | H04L 5/0094 |
| 2021/0014036 | A1* | 1/2021 | Chen | H04W 72/0446 |
| 2021/0168783 | A1* | 6/2021 | Islam | H04W 72/23 |
| 2021/0259002 | A1* | 8/2021 | Hosseini | H04W 72/0453 |
| 2021/0259010 | A1* | 8/2021 | Yang | H04W 72/23 |
| 2022/0217750 | A1* | 7/2022 | Liu | H04W 72/21 |
| 2022/0240181 | A1* | 7/2022 | Chen | H04W 72/1268 |
| 2023/0188305 | A1* | 6/2023 | Bagheri | H04L 5/0053 |
| | | | | 370/329 |
| 2023/0189255 | A1* | 6/2023 | Bagheri | H04L 1/1812 |
| | | | | 370/329 |
| 2023/0217459 | A1* | 7/2023 | Khoshnevisan | H04W 72/23 |
| | | | | 370/329 |
| 2023/0254105 | A1* | 8/2023 | Wong | H04L 5/0053 |
| | | | | 370/281 |
| 2024/0064730 | A1* | 2/2024 | Andersson | H04W 52/0216 |

FOREIGN PATENT DOCUMENTS

| | | |
|---|---|---|
| KR | 10-2019-0098708 | 8/2019 |
| KR | 10-2019-0103321 | 9/2019 |
| WO | 2019184688 | 10/2019 |

OTHER PUBLICATIONS

Vivo, "UL inter-UE Tx prioritization for URLLC," R1-1908162, 3GPP TSG RAN WG1 #98, Aug. 2019, 16 pages.
Vivo, "Summary#1 of UL inter UE Tx prioritization/multiplexing," R1-1909460, 3GPP TSG RAN WG1 #98, Aug. 2019, 41 pages.
Vivo, "Summary#2 of UL inter UE Tx prioritization/multiplexing," R1-1909774, 3GPP TSG RAN WG1 #98, Aug. 2019, 42 pages.
Huawei et al., "UL inter-UE transmission prioritization and multiplexing," R1-1908055, 3GPP TSG RAN WG1 Meeting #98, Aug. 2019, 15 pages.
Japan Patent Office Application No. 2022-520727, Office Action dated Jul. 23, 2024, 5 pages.
InterDigital Inc., "Enhanced Inter UE Transmit prioritization/multiplexing for eURLLC", R1-1909453, 3GPP TSG RAN WG1 #98, Aug. 2019, 7 pages.
LG Electronic, "Discussion on UL inter UE Tx prioritization", R1-1910830, 3GPP TSG RAN WG1 #98bis, Oct. 2019, 8 pages.
Vivo, "Summary of UL inter UE Tx prioritization for URLLC", R1-2001676, 3GPP TSG RAN WG1 #100bis, Apr. 2020, 25 pages.
Wilus Inc., "On UL cancellation scheme for NR URLLC", R1-1907387, 3GPP TSG RAN WG1 #97, May 2019, 5 pages.
Samsung, "UL inter-UE multiplexing/prioritization", R1-1906959, 3GPP TSG RAN WG1 #97, May 2019, 5 pages.
The State Intellectual Property Office of the People's Republic of China Application Serial No. 202080069314.0, Office Action dated Aug. 30, 2024, 6 pages.
Tdoc List Meeting RAN1#66, 34 pages Oct. 5, 2017.

\* cited by examiner

METHOD FOR MONITORING UPLINK CANCELLATION INSTRUCTION, USER EQUIPMENT, APPARATUS, COMPUTER-READABLE STORAGE MEDIUM, METHOD FOR TRANSMITTING UPLINK CANCELLATION INSTRUCTION, AND BASE STATION

CROSS-REFERENCE TO RELATED APPLICATIONS

This application is the National Stage filing under 35 U.S.C. 371 of International Application No. PCT/KR2020/013453, filed on Oct. 5, 2020, which claims the benefit of earlier filing date and right of priority to Korean Application Nos. 10-2019-0122825, filed on Oct. 4, 2019, and 10-2019-0143044, filed on Nov. 8, 2019, and also claims the benefit of U.S. Provisional Application No. 62/912,024, filed on Oct. 7, 2019, 62/938,309, filed on Nov. 20, 2019, and 63/011,194, filed on Apr. 16, 2020, the contents of which are all incorporated by reference herein in their entirety.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Problem

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solution

An aspect of the present disclosure may provide a method of performing uplink cancelation indication (UL CI) monitoring by a user equipment (UE). The method may include receiving a configuration related to a physical downlink control channel (PDCCH) monitoring occasion (MO) for UL CI reception, receiving scheduling information for a uplink (UL) transmission, and performing or skipping, in the PDCCH MO, UL CI monitoring for the UL transmission based on the configuration and the scheduling information. Performing or skipping, in the PDCCH MO, the UL CI monitoring for the UL transmission may include, based on the UL transmission overlapping at least in time with a reference resource region to be indicated by a UL CI received in the PDCCH MO, performing, in the PDCCH MO, the UL CI monitoring for the UL transmission, and based on the UL transmission not overlapping in time with the reference resource region, skipping, in the PDCCH MO, the UL CI monitoring for the UL transmission.

Another aspect of the present disclosure may provide a user equipment for performing uplink cancelation indication (UL CI) monitoring in a wireless communication system. The user equipment may include at least one transceiver, at least one processor, and at least one computer memory operatively connectable to the at least one processor, and storing instructions that when executed causes the at least one processor to perform operations. The operations may include receiving a configuration related to a physical downlink control channel (PDCCH) monitoring occasion (MO) for UL CI reception, receiving scheduling information for a uplink transmission (UL) transmission, and performing or skipping, in the PDCCH MO, UL CI monitoring for the UL transmission based on the configuration and the scheduling information. Performing or skipping, in the PDCCH MO, the UL CI monitoring for the UL transmission may include, based on the UL transmission overlapping at least in time with a reference resource region to be indicated by a UL CI received in the PDCCH MO, performing, in the PDCCH MO, the UL CI monitoring for the UL transmission, and based on the UL transmission not overlapping in time with the reference resource region, skipping, in the PDCCH MO, the UL CI monitoring for the UL transmission.

Another aspect of the present disclosure may provide an apparatus for a user equipment in a wireless communication system. The apparatus may include at least one processor, and at least one computer memory operatively connectable to the at least one processor, and storing instructions that when executed causes the at least one processor to perform operations. The operations may include receiving a configuration related to a physical downlink control channel (PDCCH) monitoring occasion (MO) for UL CI reception, receiving scheduling information for a uplink transmission (UL) transmission, and performing or skipping, in the PDCCH MO, UL CI monitoring for the UL transmission based on the configuration and the scheduling information. Performing or skipping, in the PDCCH MO, the UL CI monitoring for the UL transmission may include, based on the UL transmission overlapping at least in time with a reference resource region to be indicated by a UL CI received in the PDCCH MO, performing, in the PDCCH MO, the UL CI monitoring for the UL transmission, and based on the UL transmission not overlapping in time with the reference resource region, skipping, in the PDCCH MO, the UL CI monitoring for the UL transmission.

Another aspect of the present disclosure may provide a computer readable storage medium. The computer readable storage medium may store at least one computer program that includes instructions that, when executed by at least one processor, causes the at least one processor to perform operations for a user equipment. The operations may include receiving a configuration related to a physical downlink control channel (PDCCH) monitoring occasion (MO) for UL CI reception, receiving scheduling information for a uplink transmission (UL) transmission, and performing or skipping, in the PDCCH MO, UL CI monitoring for the UL transmission based on the configuration and the scheduling information. Performing or skipping, in the PDCCH MO, the UL CI monitoring for the UL transmission may include, based on the UL transmission overlapping at least in time with a reference resource region to be indicated by a UL CI received in the PDCCH MO, performing, in the PDCCH MO, the UL CI monitoring for the UL transmission, and based on the UL transmission not overlapping in time with the reference resource region, skipping, in the PDCCH MO, the UL CI monitoring for the UL transmission.

Another aspect of the present disclosure may provide a method of transmitting uplink cancelation indication (UL CI) by a base station in a wireless communication system. The method may include transmitting a configuration related to a physical downlink control channel (PDCCH) monitoring occasion (MO) for UL CI transmission, transmitting scheduling information for uplink (UL) transmission to a user equipment, and based on the configuration and the scheduling information, performing or skipping transmission of the UL CI for the UL transmission in the PDCCH MO. Performing or skipping the transmission of the UL CI for the UL transmission may include, based on the UL transmission overlapping at least in time with a reference resource region to be indicated by the UL CI transmitted in the PDCCH MO, performing, in the PDCCH MO, transmission of the UL CI for the UL transmission, and based on the UL transmission not overlapping in time with the reference resource region, skipping, in the PDCCH MO, the transmission of the UL CI for the UL transmission.

Another aspect of the present disclosure may provide a base station for transmitting uplink cancelation indication (UL CI) in a wireless communication system. The BS may include at least one transceiver, at least one processor, and at least one computer memory operatively connectable to the at least one processor, and storing instructions that when executed causes the at least one processor to perform operations. The operations may include transmitting a configuration related to a physical downlink control channel (PDCCH) monitoring occasion (MO) for UL CI transmission, transmitting scheduling information for a uplink transmission (UL) transmission to a user equipment, and performing or skipping, in the PDCCH MO, transmission of the UL CI for the UL transmission based on the configuration and the scheduling information. Performing or skipping, in the PDCCH MO, the transmission of the UL CI for the UL transmission may include, based on the UL transmission overlapping at least in time with a reference resource region to be indicated by the UL CI transmitted in the PDCCH MO, performing, in the PDCCH MO, the transmission of the UL CI for the UL transmission, and based on the UL transmission not overlapping in time with the reference resource region, skipping, in the PDCCH MO, the transmission of the UL CI for the UL transmission.

According to each aspect of the present disclosure, the operations related to the method for the user equipment, the user equipment, or the computer readable storage medium may further include detecting the UL CI for the UL transmission based on performing the UL CI monitoring, and based on the detecting the UL CI, canceling the UL transmission in a resource indicated by the UL CI among resources of the UL transmission.

According to each aspect of the present disclosure, the reference resource region may include Y symbols in a time domain. A first symbol among the Y symbols may be a first symbol that is after X symbols from end of the PDCCH MO, X being a predefined value and Y being determined based on the configuration.

According to each aspect of the present disclosure, the scheduling information is received/transmitted prior to the reference resource region in a time domain.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure.

MODE FOR INVENTION

Figure 1:
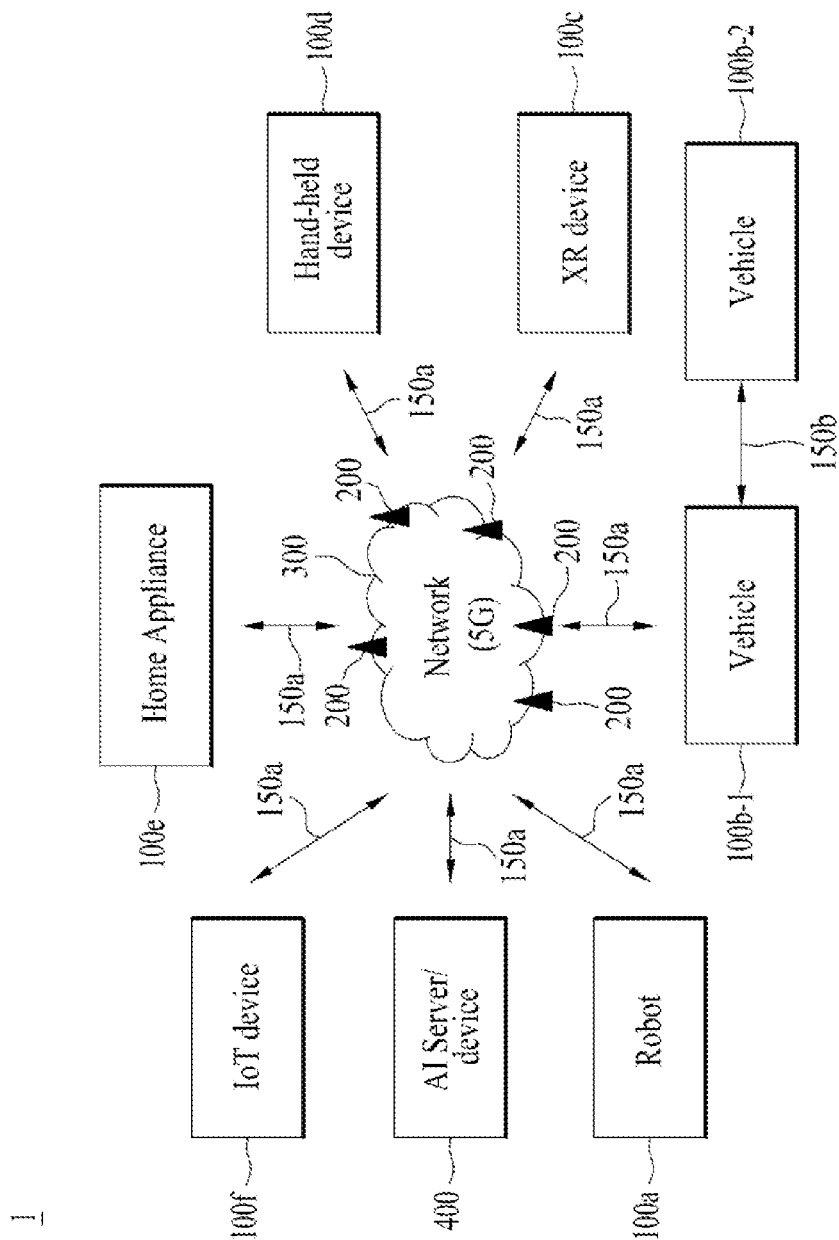
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, anode refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resource elements (REs) that carry downlink control information (DCI), and the PDSCH refers to a set of REs that carry DL data. The PUCCH, PUSCH, and PRACH refer to a set of time-frequency REs that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
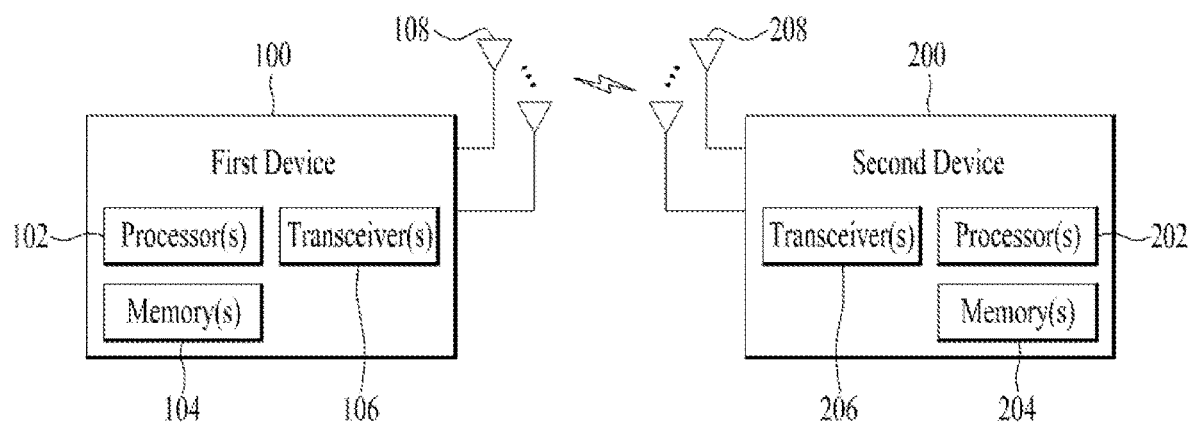
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
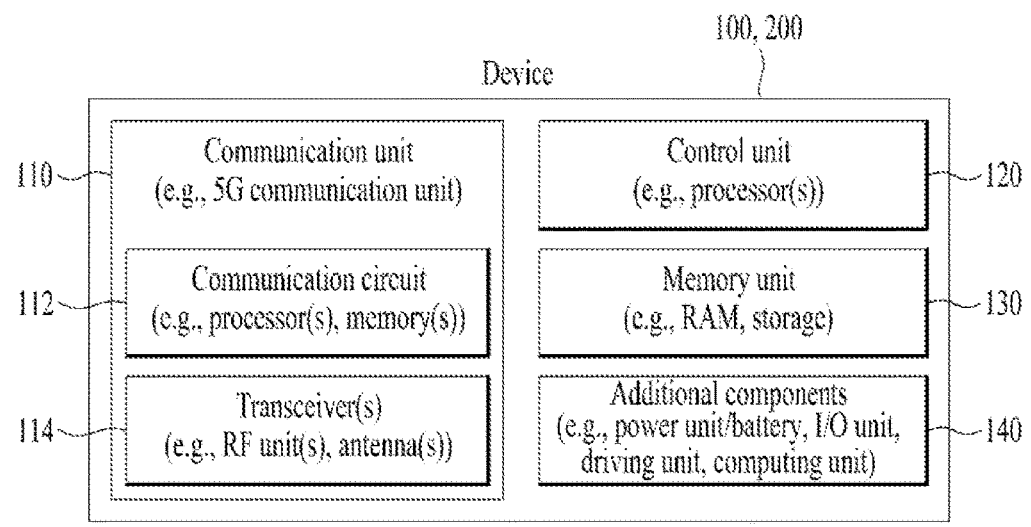
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
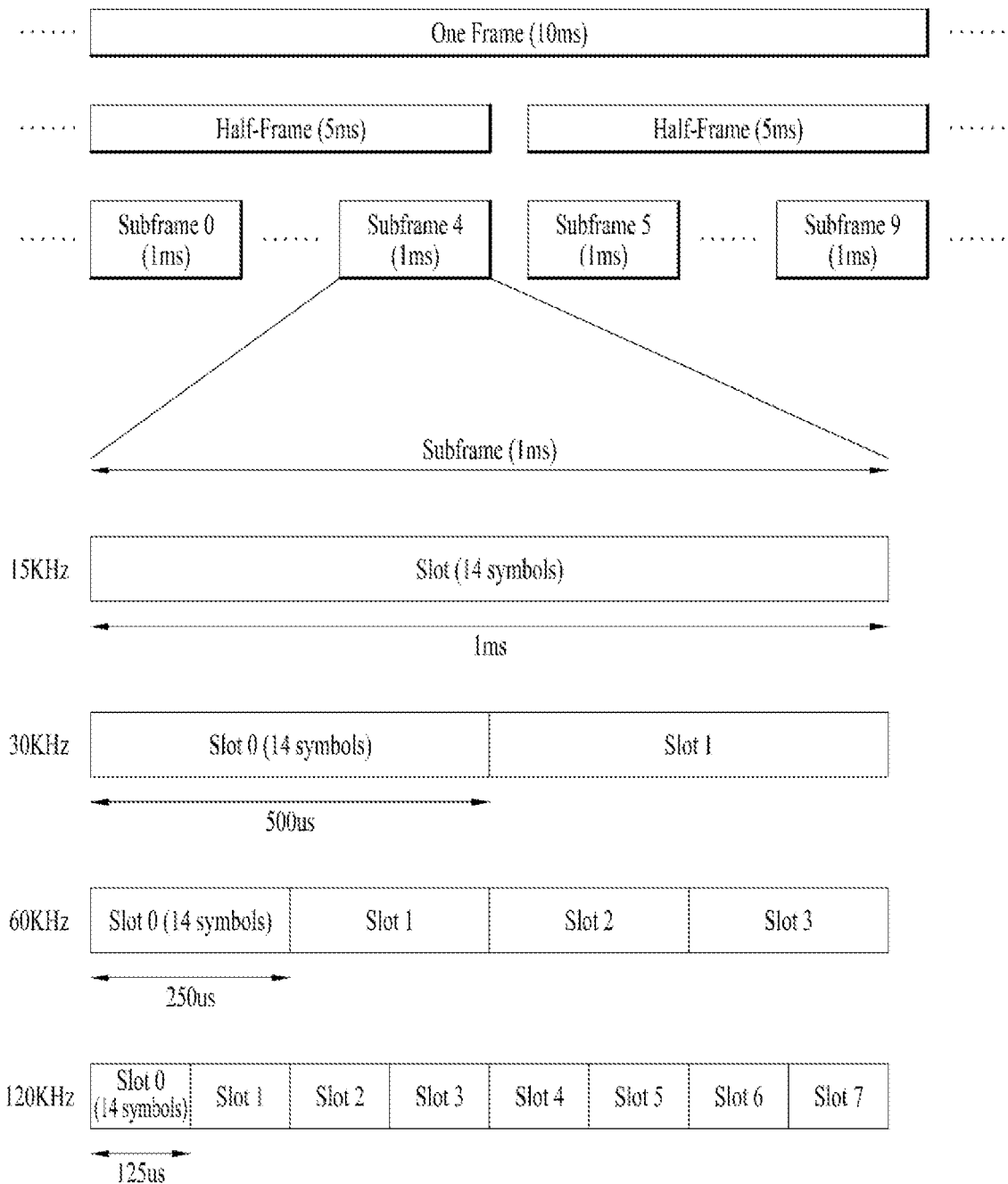
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix—OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} * N_f / 100) * T_c = 10$ ms and is divided into two half-frames of 5 ms each. A basic time unit for NR is $T_c = 1/(\Delta f_{max} * N_f)$ where $\Delta f_{max} = 480 * 10^3$ Hz and $N_f = 4096$. For reference, a basic time unit for LTE is $T_s = 1/(\Delta f_{ref} * N_{f,ref})$ where $\Delta f_{ref} = 15 * 10^3$ Hz and $N_{f,ref} = 2048$. $T_c$ and $T_f$ have the relationship of a constant $\kappa = T_s/T_c = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For the search space configuration u, slots are numbered as $n^u_s \in \{0, \ldots n^{subframe,u}_{slot}-1\}$ in ascending order within a subframe and as $n^u_{s,f} \in \{0, \ldots, n^{frame,u}_{slot}-1\}$ in ascending order within a frame.

Figure 5:
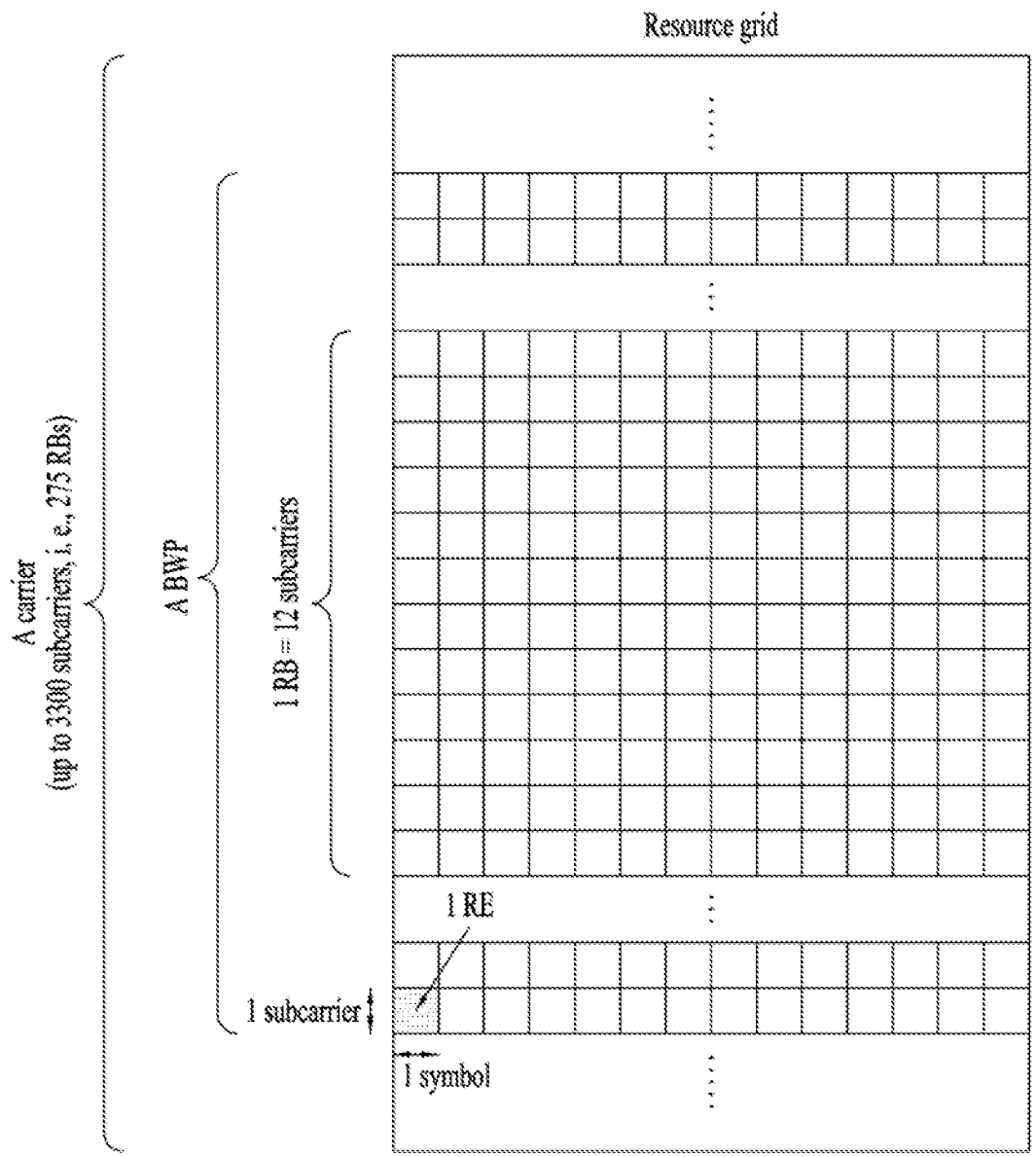
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB} = n^u_{CRB} + N^{size,u}_{BWP,i}$, where $N^{size}_{BWP,i}$ is a CRB in which the BWP starts relative to CRB 0. The BWP includes a plurality of consecutive RBs in the frequency domain. For example, the BWP is a subset of contiguous CRBs defined for given neurology $u_i$ in BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in the set of DL BWPs or UL BWPs, the network configures at least an initial DL BWP and one (when the serving cell is configured with uplink) or two (when supplementary uplink is used) initial UL BWPs. The network may configure additional UL and DL BWPs for the serving cell. For each DL BWP or UL BWP, the UE is provided with the following parameters for the serving cell: $O_{carrier}$ provided by an RRC parameter offsetToCarrier for CRB $V^{start}_{BWP} = O_{carrier} + RB_{start}$, the number of contiguous RBs $N^{size}_{BWP} = L_{RB}$, and subcarrier spacing, provided by an RRC parameter locationAndBandwidth indicating offset $RB_{set}$ and length $L_{RB}$ as resource indicator values (RIVs) based on i) subcarrier spacing; ii) cyclic prefix; iii) the assumption that $N^{start}_{BWP} = 275$; an index in the set of the DL BWPs or UL BWPs; a set of BWP-common parameters and a set of BWP-only parameters.

Virtual resource blocks (VRBs) are defined in a BWP and are numbered from 0 to $N^{size,u}_{BWP,i}-1$, where i is the number of the BWP. The VRBs are mapped to physical resource blocks (PRBs) according to non-interleaved mapping. In some implementations, in non-interleaved VRB-to-PRB mapping, VRB n may be mapped to PRB n.

Figure 6:
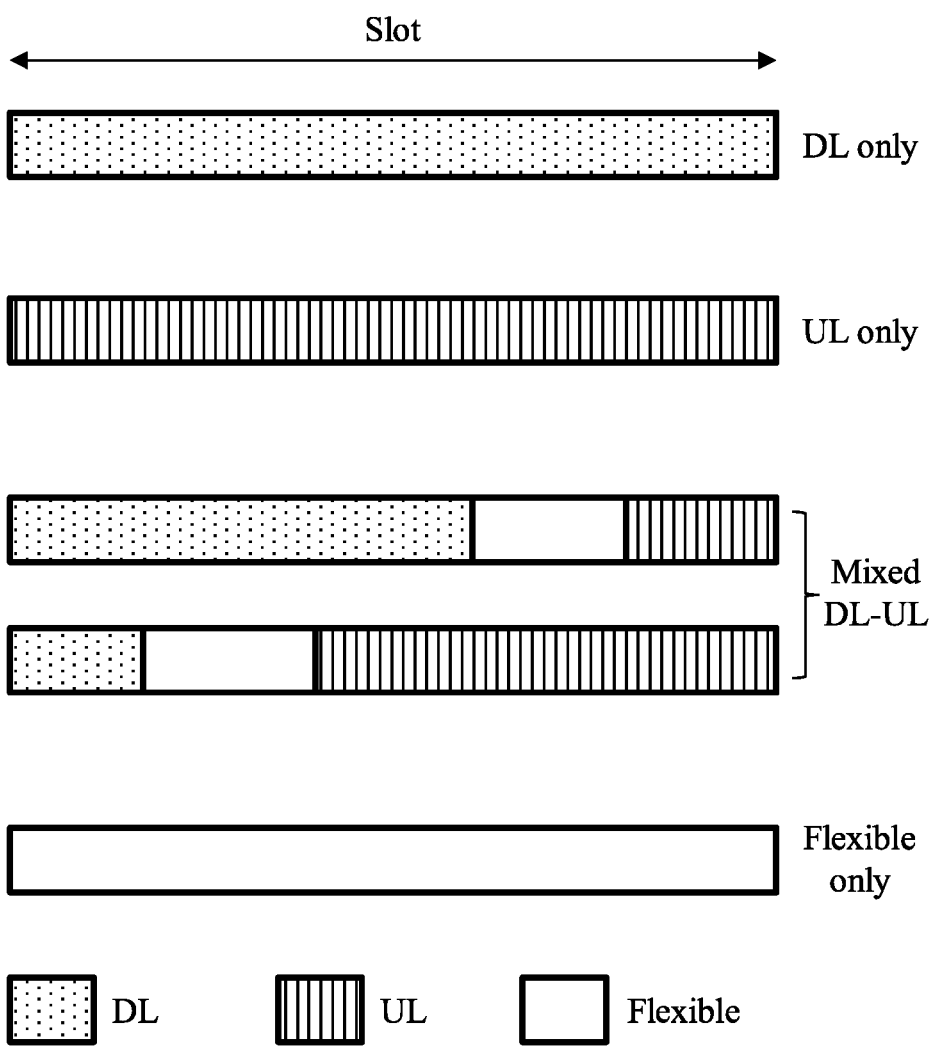
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:
  dl-UL-TransmissionPeriodicity that provides a periodicity of the DL-UL pattern;
  nrofDownlinkSlots that provides the number of consecutive full DL slots at the beginning of each DL-UL pattern, where the full DL slots are slots having only DL symbols;
  nrofDownlinkSymbols that provides the number of consecutive DL symbols at the beginning of a slot immediately following the last full DL slot;
  nrofUplinkSlots that provides the number of consecutive full UL slots at the end of each DL-UL pattern, where the full UL slots are slots having only UL symbols; and
  nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to a radio network temporary identifier (RNTI) used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
|---|---|---|
| FR1 | 410 MHz-7125 MHZ | 15, 30, 60 kHz |
| FR2 | 24250 MHz-52600 MHZ | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including information about resource allocation of the DL-SCH is referred to as PDSCH scheduling DCI, and DCI including information about resource allocation of the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2
PUCCH resource set #1, if 2<the number of UCI bits=<$N_1$
. . .
PUCCH resource set #(K−1), if $N_{K-2}$<the number of UCI bits=<$N_{K-1}$ Here, K represents the number of PUCCH resource sets (K>1) and $N_1$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 5).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.
Resource Allocation by PDCCH: Dynamic Grant/Assignment The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$, resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 01, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
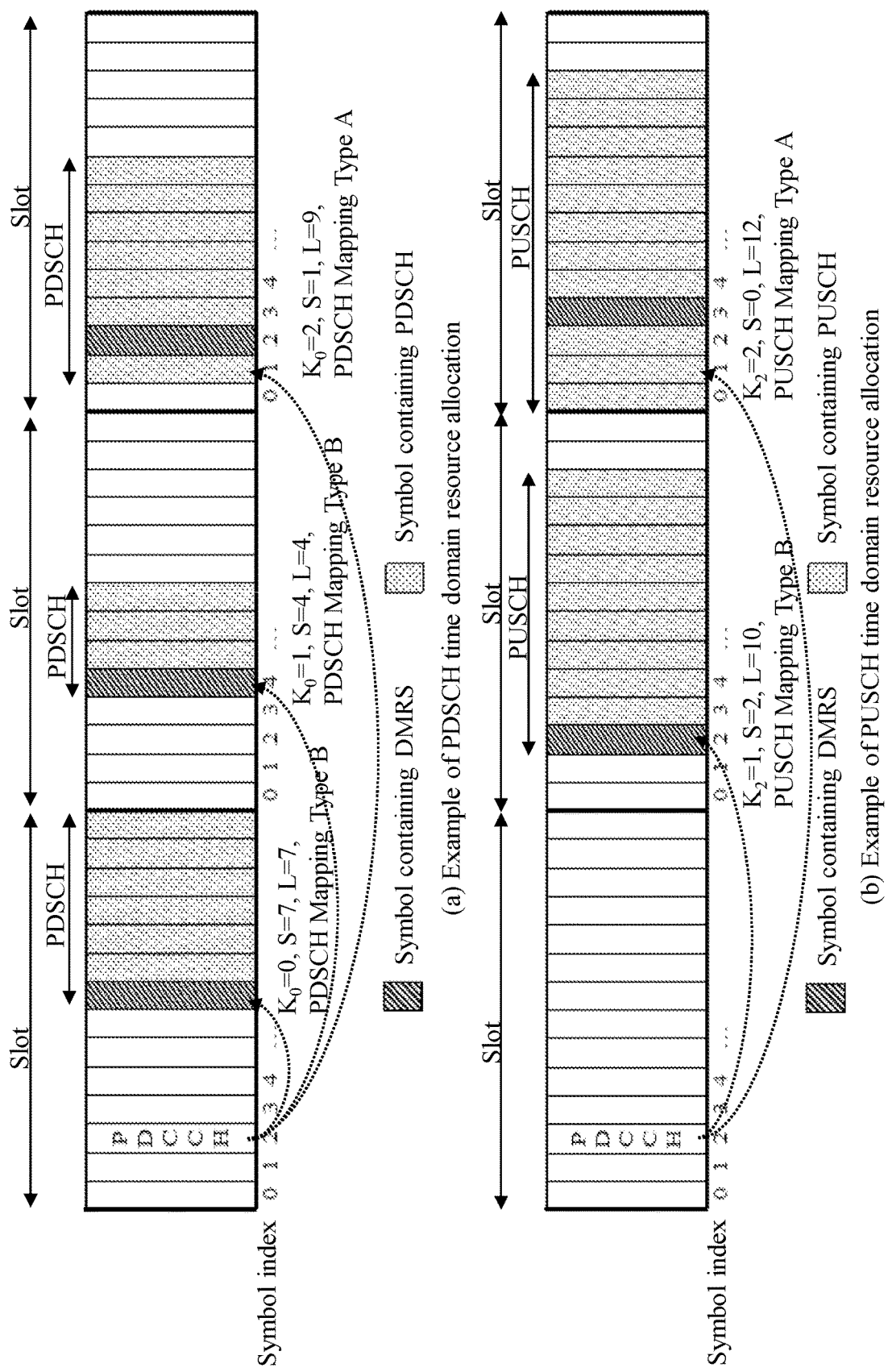
FIG. 7 illustrates an example of PDSCH time domain resource assignment (TDRA) caused by a PDCCH and an example of PUSCH TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type has two mapping types: mapping type A and mapping type B. In PDSCH/PUSCH mapping type A, a demodulation reference signal (DMRS) is mapped to a PDSCH/PUSCH resource based on the start of a slot. According to other DMRS parameters, one or two symbols among the symbols of the PDSCH/PUSCH resource may be used as DMRS symbol(s). For example, in PDSCH/PUSCH mapping type A, the DMRS is located on the third symbol (symbol #2) or the fourth symbol (symbol #3) in the slot according to RRC signaling. In PDSCH/PUSCH mapping type B, the DMRS is mapped based on the first OFDM symbol of the PDSCH/PUSCH resource. According to other DMRS parameters, one or two symbols from the first symbol of the PDSCH/PUSCH resource may be used as DMRS symbol(s). For example, in PDSCH/PUSCH mapping type B, the DMRS is located on the first symbol allocated for PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;
periodicity corresponding to a periodicity of configured grant Type 1;
timeDomainOffset indicating an offset of a resource with respect to system frame number (SFN)=0 in the time domain;
timeDomainAllocation value m that provides a row index m+1 pointing to the allocation table, indicating a combination of the start symbol S, the length L, and the PUSCH mapping type;
frequencyDomainAllocation that provides frequency domain resource allocation; and
mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame* numberOfSymbolsPerSlot)+symbol number in the slot]= (timeDomainOffset*numberOfSymbolsPerSlot+S+N* periodicity) modulo (1024*numberOfSlotsPerFrame*number OfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:

cs-RNTI corresponding to a CS-RNTI for activation, deactivation, and retransmission; and
periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*numberOfSymbolsPerSlot)+(slot number in the frame*numberOfSymbolsPerSlot)+symbol number in the slot]=[(SFN$_{start\ time}$*numberOfSlotsPerFrame*numberOfSymbolsPerSlot+slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 7 and Table 8. Table 7 shows an example of special fields for DL SPS and UL grant Type 2 scheduling activation PDCCH validation, and Table 8 shows an example of special fields for DL SPS and UL grant Type 2 scheduling release PDCCH validation.

TABLE 6

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 7

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 8:
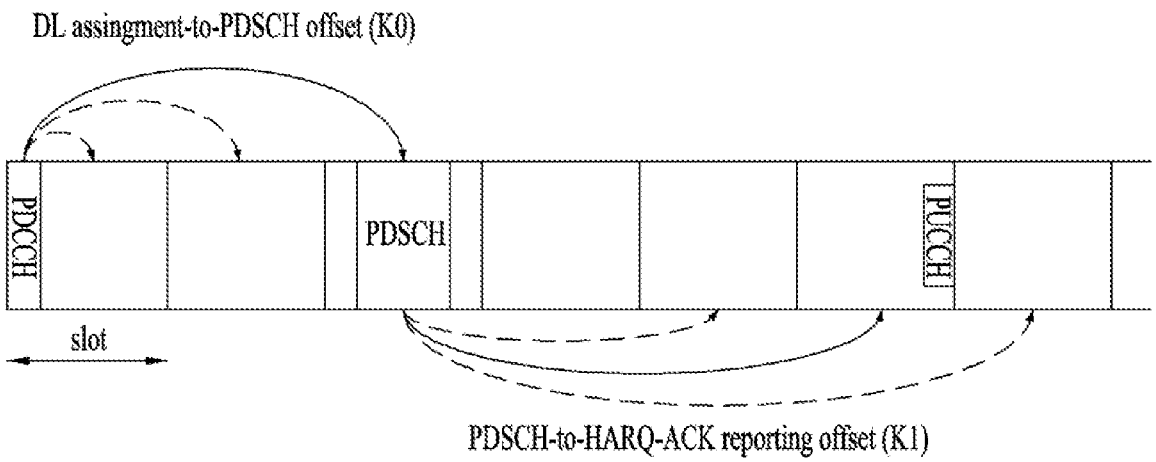
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 11) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n−k). For example, when k∈{1, 2, 3, 4, 5, 6, 7, 8}, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.

controlResourceSetId: an identifier for identifying a CORESET p associated with a search space set s.

monitoringSlotPeriodicityAndOffset: a PDCCH monitoring periodicity of slots $k_s$ and a PDCCH monitoring offset of $o_s$ slots to configure slots for PDCCH monitoring.

duration: a duration of $T_s < k_s$ slots indicating a number of slots in which the search space set s exists.

monitoringSymbolsWithinSlot: a PDCCH monitoring pattern within a slot, indicating first symbol(s) of the CORESET within a slot for PDCCH monitoring.

nrofCandidates: a number of PDCCH candidates per CCE aggregation level.

searchSpaceType: an indication that search space set s is either a CCE set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, when monitoringSymbolsWithinSlot is a 14-bit parameter, the most significant (leftmost) bit may represent the first OFDM symbol in the slot, and the second most significant (leftmost) bit may represent the second OFDM symbol in the slot. In this way, the bits of monitoringSymbolsWithinSlot may represent the 14 OFDM symbols of the slot, respectively. For example, bit(s) set to 1 among the bits in monitoringSymbolsWithinSlot may identify the first symbol(s) of the CORESET in the slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^\mu_{s,f}$ in a frame with number $n_f$ if $(n_f * N^{frame,u}_{slot} + n^u_{s,f} - o_s)$ mod $k_s = 0$. The UE monitors PDCCH candidates for search space set s for $T_s$ consecutive slots, starting from slot $n^u_{s,f}$, and does not monitor PDCCH candidates for search space set s for the next $k_s - T_s$.

The following table shows search space sets, related RNTIs, and use cases thereof.

TABLE 8

| Search Space Set | RNTI | Use Case |
|---|---|---|
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| USS set | C-RNTI, or MCS-C-RNTI, or CS-RNTI(s) | User specific PDSCH decoding |

The following table shows DCI formats carried by a PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 10 may be used to schedule a TB-based (or TB-level) PDSCH, and DCI format 1_1 may be used to schedule a TB-based (or TB-level) PDSCH or a CBG-based (or CBG-level) PDSCH. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 2_0 may be used to transfer dynamic slot format information (e.g., SFI DCI) to the UE, and DCI format 21 may be used to transfer downlink pre-emption information to the UE. DCI format 2_4 may be used to indicate a UL resource for which UL transmission from the UE should be canceled.

For example, each of DCI format 0_0 and DCI format 0_1 may include an FDRA field for scheduling a PUSCH, and each of DCI format 1_0 and DCI format 11 may include an FDRA field for scheduling a PDSCH. The number of bits in the FDRA field of each of DCI format 0_0 and DCI format 0_1 may be determined based on $N_{RB}^{UL,BWP}$, which is the size of an active or initial UL BWP. The number of bits in the FDRA field of each of DCI format 1_0 and DCI format 1_1 may be determined based on $N_{RB}^{DL,BWP}$, which is the size of an active or initial DL BWP.

One of the representative scenarios of the next system, URLLC has the low-latency and high-reliability requirements of a user-plane delay of 0.5 ms and transmission of X bytes of data within 1 ms at or below an error rate of $10^{-5}$. In general, eMBB is characterized by a large traffic capacity, a file size equal to or less than tens to hundreds of bytes, and sporadic occurrence. Accordingly, the eMBB may require transmission for maximizing a transfer rate and minimizing overhead of control information and URLLC may require a relatively short transmission period (e.g., two symbols) and a reliable transmission method.

A reference time unit assumed/used to transmit/receive a physical channel may vary among application fields or types of traffic. The reference time may be a basic unit for scheduling a specific physical channel, and the reference time unit may depend on the number of symbols and/or subcarrier spacing, and the like constituting the corresponding scheduling time unit. For simplicity, some embodiments/implementations of the present disclosure are described based on a slot or mini-slot as a reference time unit. A slot may be, for example, a basic unit for scheduling used for general data traffic (e.g., eMBB). A mini-slot may have a smaller time period than a slot in the time domain, and may be a basic unit for scheduling used in a special purpose or in a special communication scheme (e.g., URLLC, or unlicensed band or millimeter wave, etc.). However, embodiment(s)/implementation(s) of the present disclosure may be applied even in transmitting/receiving a physical channel based on the mini-slot for the eMBB service or transmitting/receiving a physical channel based on the slot for URLLC or other communication techniques.

The above description (the 3GPP-based system, the frame structure, etc.) may be applied in combination with methods proposed in the present disclosure to be described later or may be supplemented to clarify the technical features of the methods proposed in the present disclosure.

The present disclosure will describe a method of reducing power consumption and facilitating implementations of a UE with a service (e.g., eMBB) that allows long latency and/or low reliability using a limited PDCCH monitoring occasion (MO) by the UE when various types of services such as eMBB and URLLC that require different delays and reliability are supported through dynamic resource sharing between UEs.

Even if an available UL resource is pre-allocated to a UE (eMBB UE) using a service such as an eMBB, dynamic resource sharing may be used to allocate a UL resource to a UE (URLLC UE) using a service (e.g., URLLC) that requires low latency and/or high reliability. In this case, a BS may schedule a UL resource pre-occupied by the eMBB UE to the UE using a service such as URLLC and may instruct the eMBB UE not to use the pre-allocated UL resource through uplink cancelation indication (UL CI).

For a series of operations, the eMBB UE needs to detect the UL CI in the PDCCH. The UL CI needs to be detected by the eMBB UE before UL transmission of the URLLC UE begins, and thus the eMBB UE may stop UL transmission thereof to successfully reduce interference on URLLC transmission. According to a service such as URLLC, transmission may begin within a short time after scheduling, and thus a monitoring occasion (MO) frequency of the PDCCH for carrying UL CI needs to be frequent enough in order for the eMBB UE to detect the UL CI within a corresponding time. However, DCI normally transferred to the eMBB UE may not need to be indicated at such a short interval, and thus frequent PDCCH monitoring may generally consume unnecessary power and waste computational capability for the eMBB UE. To overcome the problem, it may be necessary to configure a PDCCH MO for an uplink cancelation indication (UL CI) appropriate for the eMBB UE and to limit the UE to monitor the UL CI only under a specific condition.

The present disclosure proposes method(s) for configuring the PDCCH MO appropriate for the UE by the BS and/or condition(s) for monitoring the UL CI by a given UE. In addition, the present disclosure proposes method(s) for additionally reducing unnecessary monitoring by limiting the UL CI to be limited only to specific UL transmission.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

The present disclosure proposes method(s) of monitoring (i.e., monitoring of a PDCCH carrying the UL CI) the UL CI by the UE only in a MO that satisfies a specific condition even if a BS configures a MO in which the UE monitors the UL CI to the UE in order to prevent the UE to unnecessarily monitor the UL CI. For example, the specific condition may include a condition related to UL transmission that is pre-scheduled or configured to the corresponding UE and/or a message related thereto and/or a time/frequency resource of a radio resource used in UL transmission. In some implementations, UL transmission used in the specific condition may be limited to a specific type of UL transmission.

The following proposal(s) of the present disclosure will be described using a physical uplink shared channel (PUSCH) as an example for convenience, but may be extended and applied to other UL and/or DL channels and signals.

In Terms of UE

First, implementations of the present disclosure will be described in terms of a UE.

Figure 9:
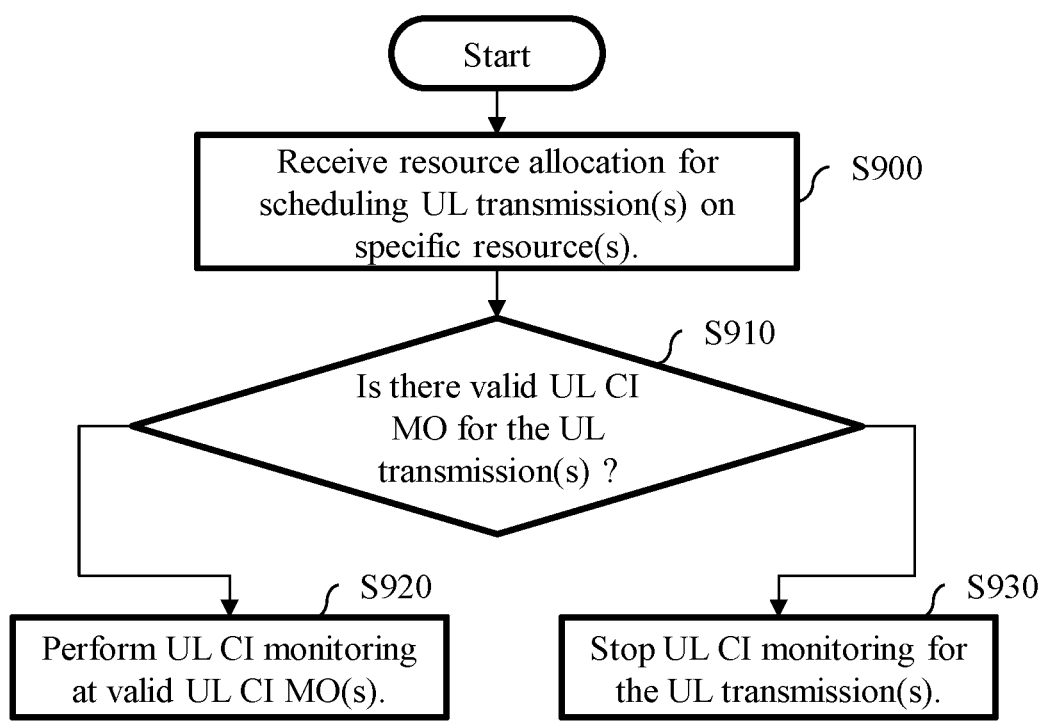
FIG. 9 illustrates an example of a UE operation according to some implementation(s) of the present disclosure.

FIG. 9 illustrates an example of a UE operation according to some implementation(s) of the present disclosure. In the present disclosure, the UE may monitor the UL CI only in a valid MO for canceling UL transmission indicated or configured to the UE by the UL CI. Hereinafter, an example of the UE operation according to some implementation(s) of the present disclosure will be described.

(1) The UE may receive UL scheduling (e.g., resource allocation for UL transmission) from a BS.

The operation of receiving UL scheduling from the BS by the UE may be implemented by, for example, the device of FIG. 2 or 3. For example, referring to FIG. 2, the one or more processors 102 may control the one or more transceivers 106 and/or the one or more memories 104 to receive the UL scheduling from the BS, and the one or more transceivers 106 may receive the UL scheduling from the BS. In this case, the UL scheduling may be received in the DCI. Alternatively, the UL scheduling may be configured to the UE by radio resource control (RRC) signaling from the BS.

Before receiving the UL scheduling, the UE may receive RRC configuration information from the BS. For example, the UE may receive RRC configuration information including specific parameter(s) related to a MO and a resource configured for transmission/reception of the UL CI described in implementations A1 to A9. In some implementations of the present disclosure, the specific parameters may include the following parameters.

SearchSpace IE: A parameter for configuring to a UE whether a UL CI is able to received in a MO. For example, the SearchSpace IE may include a parameter related to whether the UL CI is likely to be received in the MO indicated/configured by the SearchSpace IE, and the UE may recognize the MO in which the UL CI is likely to be received through the SearchSpace IE transmitted through the RRC configuration. For example, when the SearchSpace IE includes a DCI format (e.g., DCI format 2_4) of the UL CI, the UE may determine that there is a possibility that the UL CI is transmitted in the MO configured by the SearchSpace IE.

ControlResourceSet IE: A parameter related to a set of resources in which the UL CI is transmitted/received. For example, the UE may receive control information from the BS through at least one resource included in the ControlResourceSet IE. For example, the UE may receive the UL CI by monitoring whether the UL CI is transmitted through a resource region included in the ControlResourceSet IE in the MO indicated by the SearchSpace IE.

The operation of receiving RRC configuration information including the specific parameters related to the MO and the resource configured for reception of the UL CI described in implementations A1 to A9 may be implemented by the device of FIG. 2 or 3. For example, referring to FIG. 2, the one or more processors 102 may control the one or more transceivers 106 and/or the at least one memory 104 to receive RRC configuration information including the specific parameters related to the MO and the resource configured for reception of the UL CI described in implementations A1 to A9, and the one or more transceivers 106 may receive the specific parameters related to the MO and the resource configured for reception of the UL CI from the BS through the RRC configuration information.

(2) The UE may determine a valid UL CI MO that satisfies the specific condition according to some implementations of the present disclosure (S910).

For example, the UE may monitor a CI for cancellation of allocation of a resource region for UL transmission in a MO using the method described in any one of implementations A1 to A5. In this case, the UE may determine whether the MO is valid in order to determine the MO for monitoring the CI as described in implementation A1.

In some implementations of the present disclosure, whether the MO is valid may be restrictedly determined in order to reduce the number of MOs that the UE needs to monitor. In some implementations of the present disclosure, a parameter for limiting the number of MOs may be transmitted to the UE from the BS, or the number of conditions for determining the validity of the MO by the UE may increase. For example, when receiving the parameter for limiting the number of the MOs for determining the validity through an RRC configuration from the BS, the UE may determine the validity of the MO in the limited number of MOs based on the received parameter.

In another example, when receiving the parameter for limiting the number of valid MOs through an RRC configuration from the BS, the UE may determine the validity of the MO in the maximum number of valid MOs based on the received parameter.

In implementations of the present disclosure, the UE may determine a reference UL resource as a resource region to be indicated by one UL CI based on the received parameter (e.g., SearchSpace IE or TDD-UL-DL-ConfigCommon IE). For example, the UE may recognize a MO that satisfies the condition 1 or 2 described in implementations A1-1 and A1-2 among allocated MOs as a valid MO for monitoring a CI. For example, the UE may determine that the MO is valid when the following condition is satisfied.

When a UL CI indicating previously (dynamically or semi-statically) scheduled specific UL transmission or some of radio resources used in the UL transmission can be detected in a certain UL CI MO, and/or When a UL CI is capable of indicating prescheduled UL transmission through a HARQ process ID or the like, or when the UL CI indicates a certain time and/or frequency resource region, and/or When a resource region used in specific UL transmission scheduled to the UE is included in a reference resource region of a UL CI that can be received in a certain UL CI MO, and/or When a UL CI MO (or start or end of a MO) is spaced apart from a prescheduled specific UL radio resource (or start or end of a radio resource) by a predetermined time (e.g., N symbols).

The operation of determining the valid MO by the UE may be implemented by, for example, the device of FIG. 2 or 3. For example, referring to FIG. 2, the one or more processors 102 may determine a valid MO among a plurality of configured MOs.

In some implementations of the present disclosure, an interval between a plurality of configured MOs may be determined according to implementations A8 and/or A9. For example, an interval between MOs may be determined by a search space period (e.g., a value of monitoringSlotPeriodicityAndOffset in SearchSpace IE) or may be determined as an average of actually configured UL CI intervals. For example, when N UL CI MOs are configured in one slot, different N intervals may be configured for each UL CI MO, and in this case, a period/interval for determining a reference resource region may be an average of the intervals.

(3) Then, the UE may monitor a UL CI only in a valid MO (S920 and S930).

In detail, the UE may monitor the UL CI in the valid MO using the method(s) described in implementations A2 and/or A3. In some implementations of the present disclosure, the UE may determine the valid MO and may then monitor a MO for the specific UL transmission described in implementation A3, and in this case, as described in implementation A2, only a part of specific UL transmission may be considered in monitoring of the MO. For example, the UE may consider only a predetermined number of symbols from a first symbol of specific UL transmission.

The operation of monitoring the UL CI only in the valid MO by the UE may be implemented by, for example, the device of FIG. X1 to X9 to be described after FIG. 2. For example, the operation may be implemented by the device of FIG. 2 or 3. For example, referring to FIG. 2, the one or more processors 102 may monitor a MO that is determined to be valid by the UE among a plurality of MOs.

In some implementations of the present disclosure, at least one of the following may be considered in order to determine a reference resource region related to the UL CI or the length of the reference resource region.

The length of the reference resource region of the UL CI received in a certain UL CI MO may be determined as an interval from a corresponding UL CI MO to a next UL CI MO or an integer multiple of the corresponding interval. For example, an interval from a start or last symbol of a CORESET in which a certain UL CI MO is received to a start or last symbol of a CORESET in which a next UL CI MO is received or an integer multiple of the corresponding interval may be determined as the reference resource region or the length of the reference resource region, transmission of which is to be canceled by the corresponding UL CI. In this case, the following UL CI MO may be determined using the following method.

Option 1: A UL CI MO that is the closest to (i.e., the first one in time after) a corresponding UL CI MO among UL CI MOs in which reception is possible in consideration of a TDD configuration (e.g., TDD-UL-DL-Configdedicated and TDD-UL-DL-Configcommon) and a slot format indication, received by the UE, may be determined as the next UL CI MO. When Option 1 is applied, an interval between UL CI MOs in which reception is possible may be a reference resource region of each UL CI MO, and thus according to Option1, respective reference resource regions in which reception by the UE is possible may represent an entire resource region in consideration of a UL CI MO in which actual reception by the UE occurs.

Option 2: A UL CI MO that is the closest to (i.e., the first one in time after) a corresponding UL CI MO among UL CI MOs in which reception is possible in consideration of a TDD configuration (e.g., TDD-UL-DL-Configdedicated and TDD-UL-DL-Configcommon) received by the UE may be determined as the next UL CI MO. Accordingly, the reference resource region may be determined semi-statically.

Option 3: A UL CI MO that is the closest to (i.e., the first one in time after) a corresponding UL CI MO among UL CI MOs in which reception is possible in consideration of a cell-common TDD configuration (e.g., TDD-UL-DL-Configcommon) received by the UE may be determined as the next UL CI MO. Thus, a group of UEs for monitoring the UL CI may have the same reference resource region or reference resource region length.

The length of the reference resource region of the UL CI received in a certain UL CI MO may be determined as a search space period (e.g., a value of monitoringSlotPeriodicityAndOffset in SearchSpace IE) or integer N times of the corresponding time length. In this case, N may be determined using the following method.

Option 1: In consideration of a TDD configuration (e.g., TDD-UL-DL-Configdedicated and TDD-UL-DL-Configcommon) and a slot format indication, received by the UE, the number of non-available UL CI MOs (e.g., overlapping with a UL symbol) to a next UL CI MO in which reception is possible or the number of slots in which a UL CI MO is configured but an available UL CI MO (e.g., in a DL symbol) is not present may be determined as N. Accordingly, in consideration of a UL CI MO in which actual reception of the UE occurs, the UL CI MO(s) may represent an entire resource region.

Option 2: In consideration of a TDD configuration (e.g., TDD-UL-DL-Configdedicated and TDD-UL-DL-Configcommon) received by the UE, the number of non-available UL CI MOs (e.g., overlapping with a UL symbol) to a next UL CI MO in which reception is possible or the number of slots in which a UL CI MO is configured but an available UL CI MO (e.g., in a DL symbol) is not present may be determined as N. Accordingly, the reference resource region may be determined semi-statically.

Option 3: In consideration of a cell-common TDD configuration (e.g., TDD-UL-DL-Configcommon) received by the UE, the number of non-available UL CI MOs (e.g., overlapping with a UL symbol) to a next UL CI MO in which reception is possible or the number of slots in which a UL CI MO is configured but an available UL CI MO (e.g., in a DL symbol) is not present may be determined as N. Thus, a group of UEs for monitoring the UL CI may have the same reference resource region or reference resource region length.

The operation of monitoring the UL CI only in the valid MO by the UE may be implemented by, for example, the device of FIG. 2 or 3. For example, referring to FIG. 2, the one or more processors 102 may control the one or more transceivers 106 and/or the at least one memory 104 to receive RRC configuration information including the specific parameters related to the MO and the resource configured for reception of the UL CI described in implementations A1 to A9, and the one or more transceivers 106 may receive the specific parameters related to the MO and the resource configured for reception of the UL CI through the RRC configuration information.

(4) When detecting the UL CI, the UE may cancel UL transmission according to a resource indicated by the UL CI.

In detail, when detecting (or receiving) UL CI for cancellation of specific UL transmission in a valid MO, the UE may cancel UL transmission on a resource indicated by the UL CI.

For example, when the UL CI indicates a certain time and/or frequency resource region as described in implementation A4, the UE may receive an indication or a configuration of time and/or frequency granularity of the UL CI. In this case, a value indicated by the UL CI or a bit field of the UL CI may correspond one-to-one or one-to-many to each symbol group and/or PRB subset of the reference resource region divided according to the granularity. In addition, as described in implementation A5, when the UL CI indicates a certain time and/or frequency resource region, the UE may assume that an interval of configured UL CI MOs is always an integer multiple of granularity indicating a region of a reference resource (in particular, a time reference resource) on which transmission is cancelled.

The operation of canceling UL transmission on the resource indicated by the UL CI by the UE may be implemented by the device of FIG. 2 or 3. For example, referring to FIG. 2, when the one or more processors 102 detects (or receives) a UL CI for cancellation of specific UL transmission of a valid MO, the UE may cancel UL transmission on the resource indicated by the UL CI.

(5) When the UE cancels UL transmission, the UE may check whether another UL CI MO is valid for the UL transmission again.

(6) When there is no valid UL CI MO related to the UL transmission any longer, UL CI monitoring may be stopped.

With regard to FIG. 9, the following may be additionally considered for a UE operation.

<Implementation A1> When the UE is configured to monitor a UL CI, a plurality of MOs in which the UL CI is to be received by the UE may be configured through a specific parameter (or a specific RRC parameter) included in RRC configuration information transmitted to the UE by a BS. The UE may selectively monitor a valid MO of the configured MO(s).

The specific parameter may be ControlResourceSet IE and/or SearchSpace IE. In particular, the SearchSpace IE may be used to configure whether a UE can receive a UL CI in a MO indicated by a specific parameter. For example, the SearchSpace IE may be a parameter related to whether the UL CI is likely to be received in the indicated MO, and the UE may recognize the MO in which the UL CI is likely to be received through the SearchSpace IE transmitted through the RRC configuration.

The ControlResourceSet IE may be a parameter related to a set of resources in which the UL CI is transmitted/received. For example, the UE may receive control information from the BS through at least one resource included in the ControlResourceSet IE. That is, the UE may receive a UL CI by monitoring whether the UL CI is transmitted through a resource region configured by the ControlResourceSet IE in the MO indicated by the SearchSpace IE.

In other words, the UE may determine whether to monitor the UL CI for a plurality of MOs and a plurality of resources configured through specific parameters (e.g., SearchSpace IE and ControlResourceSet IE) received through the RRC configuration information.

A valid MO may be determined based on UL transmission pre-indicated and/or preconfigured to the UE to be performed. For example, the valid MO may be a MO that satisfies at least one of the following conditions.

Alternatively, in order to monitor only fewer MOs to minimize power consumption and implementation difficulty of the UE, the validity of the MOs may be determined more strictly. That is, in order to reduce the number of MOs that the UE needs to monitor, whether the MO is valid may be restrictedly determined. For example, a parameter for limiting the number of MOs may be transmitted to the UE from the BS or the number of conditions for determining the validity of the MO may increase. For example, when receiving the parameter for limiting the number of the MOs for determining the validity through an RRC configuration from the BS, the UE may determine the validity of the MO in the limited number of MOs based on the received parameter. In another example, when receiving the parameter for limiting the number of valid MOs through an RRC configuration from the BS, the UE may determine the validity of the MO in the maximum number of valid MOs based on the received parameter. In some implementations of the present disclosure, when determining whether the MO is valid, the UE may determine only a MO, which satisfies all of a plurality of conditions (e.g., conditions 1 and 2 below), to be valid. In addition, the UE may determine a reference UL resource (i.e., a reference resource region) indicated by one UL CI based on the received parameter (e.g., SearchSpace IE and TDD-UL-DL-ConfigCommon IE).

Figure 10:
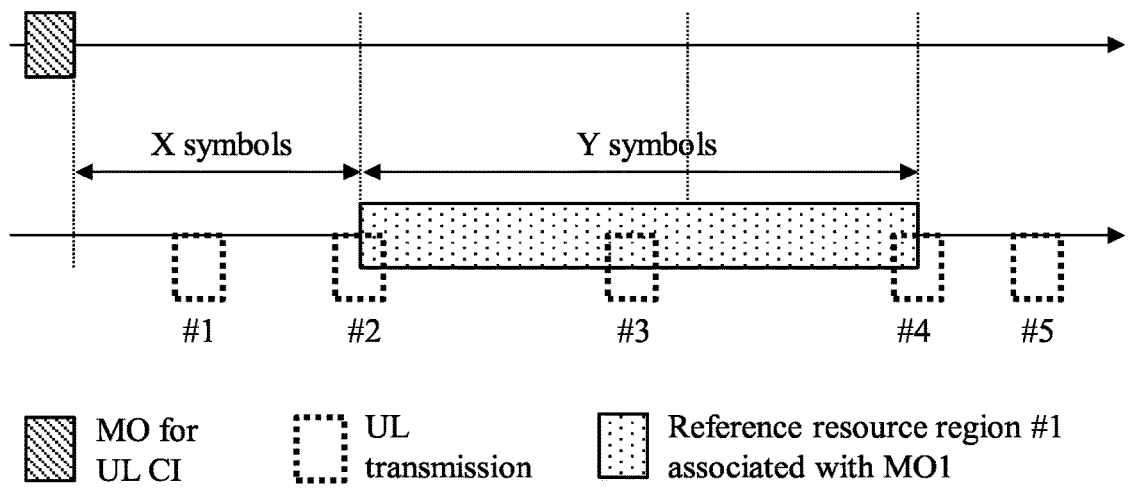
FIGS. 10 and 11 are diagrams for explaining an example of a condition used to determine a valid UL CI MO.
Figure 11:
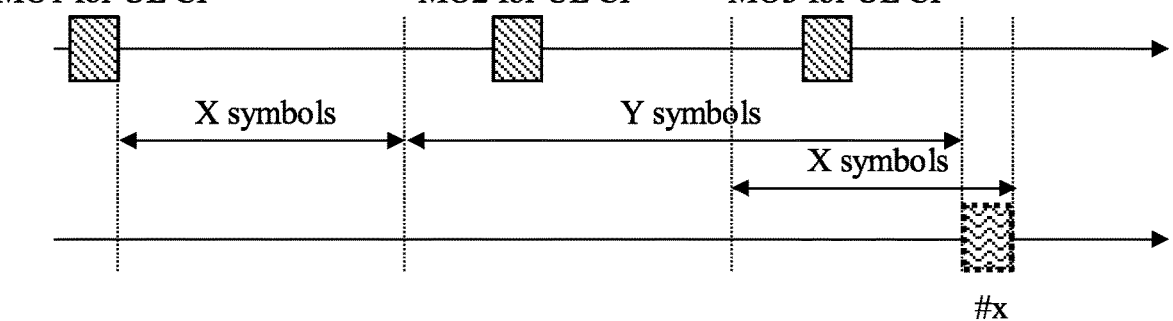

<Implementation A1-1> (Condition 1) When a UL CI indicating prescheduled specific UL transmission or some of radio resources used in the corresponding transmission can be detected in a certain UL CI MO, the UE may determine that the condition 1 is satisfied. According to the condition 1, the UE may receive only a UL CI that is capable of indicating a UL radio resource in which the UE is scheduled, and thus the corresponding UE may be prevented from unnecessarily monitoring the UL CI. FIGS. 10 and 11 are diagrams for explaining an example of a condition used to determine a valid UL CI MO.

In some implementations of the present disclosure, when a UL CI is capable of indicating prescheduled transmission through a HARQ process ID or the like, the UE may determine that a UL CI MO present between a time of receiving a scheduling message and end of the corresponding transmission satisfies the condition 1. This may be useful when the UE cancels specific scheduling indicated by the UL CI.

Alternatively, when the UL CI indicates a certain time and/or frequency resource region, and in more detail, when the UL CI indicates a part of a certain reference resource region, the UE may determine that the corresponding UL CI MO satisfies the condition 1 when a resource region used in prescheduled specific UL transmission is included in a reference resource region of a UL CI to be received in a certain UL CI MO. Referring to FIG. 10, when UL transmission #2, #3, or #4 is dynamically scheduled to the UE through DCI or is semi-statically scheduled via RRC, the UE may monitor a UL CI in a MO1 for the UL CI. In contrast, UL transmission #1 and UL transmission #5 may not overlap with reference resource region #1 (in terms of time) in which transmission is to be cancelled by the UL CI received in the MO1, and thus even if UL transmission #1 or UL transmission #5 is scheduled to the UE, the UE may not perform UL CI monitoring in the MO1 for UL transmission #1 or UL transmission #5.

For example, when a UL CI to be received in a certain UL CI MO has a certain frequency domain as the reference resource region, the UE may determine that the corresponding UL CI MO satisfies the condition 1 when prescheduled specific UL transmission uses a part of the corresponding reference resource region.

In another example, when Y symbols after X symbols from a time of receiving the UL CI correspond to a reference resource region in the time domain, the UE may determine that a UL CI MO present between a time before X+Y symbols from start of prescheduled specific UL transmission and a time before X symbols from end of the corresponding UL transmission, satisfies the condition 1. In other words, when a time domain reference resource region of a UL CI to be received in a certain UL CI MO correspond to Y symbols after X symbols from the time of receiving the UL CI, if i) start of prescheduled specific UL transmission is a time before X+Y symbols from the time of receiving the UL CI and ii) end of the specific UL transmission is a time after X symbols from the time of receiving the UL CI, the corresponding UL CI MO may be determined to satisfy the condition 1. Referring to FIG. 10, with regard to UL transmissions #2, #3, and #4, the MO1 may be determined to satisfy the condition 1. Referring to FIG. 11, it may be determined that the MO2 is valid for UL CI monitoring for UL transmission #x and the MO1 and the MO2 are not valid for UL CI monitoring for the UL transmission #x. This method may be useful when the UE cancels UL transmission using the indicated resource region or a part of the transmission.

In some implementations of the present disclosure, in order to receive an indication of a UL CI for more approximately representing a resource region in which specific UL transmission is canceled, when a resource region used by prescheduled specific UL transmission is included as K symbols or more in the reference resource region of a UL CI to be received in a certain UL CI MO, the UE may determine that the corresponding UL CI MO satisfies the condition 1. This may be to save PDCCH resources and to reduce the possibility of PDCCH collision by reducing the number of cases in which the BS transmits a plurality of UL CIs to cancel one transmission. Here, K may be a promised or predefined value or may be a value determined by L1 signaling (e.g., a PDCCH) and/or higher layer signaling of the BS.

The reference resource region (e.g., X and Y for the time domain) may be a promised or predefined region for each domain as a time/frequency resource region or may be a resource region determined by L1 signaling and/or higher layer signaling of the BS.

<Implementation A1-2> (Condition 2) When a certain UL CI MO (or start or end of a MO) is spaced apart from a prescheduled specific UL radio resource (or start or end of a radio resource) by a predetermined time (N symbols), the UE may determine that the UL CI MO is a MO that satisfies the condition 2. The condition 2 may be useful to ensure a processing time required for decoding, information interpretation, and/or UL transmission cancellation process in a process of receiving a UL CI in a MO by the UE.

When the condition 2 is considered, the predetermined N may be determined according to at least one of the following.

Processing capability related to a UL CI of the corresponding UE;
Timing advance of the corresponding UE;
Promised or predefined value; and/or
A value indicated and/or configured to the corresponding UE through L1 signaling and/or higher layer signaling of the BS.

The processing capability related to the UL CI of the UE may be newly defined for the UL CI or existing processing capability of the UE, defined for a PDSCH or a PUSCH, may be reused.

The following tables show a processing time depending on the UE processing capability. In particular, Table 10 shows an example of a PDSCH processing time for PDSCH processing capability #1 of the UE, Table 11 shows an example of a PDSCH processing time for PDSCH processing capability #2 of the UE, Table 12 shows an example of a PUSCH preparation time for PUSCH timing capability #1 of the UE, and Table 13 shows an example of a PUSCH preparation time for timing capability #2 of the UE. In Table 10, in the case of $N_{1,0}$, when PDSCH DMRS position $l_1$ of additional DMRS=12, $N_{1,0}$=14, and otherwise, $N_{1,0}$=13 (refer to section 7.4.1.1.2 of 3GPP TS 38.211).

TABLE 10

| | PDSCH decoding time N1 [symbols] | |
|---|---|---|
| u/SCS | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 11

| u/SCS | PDSCH decoding time N1 [symbols] |
|---|---|
| 0/15 kHz | 3 |
| 1/30 kHz | 4.5 |
| 2/60 kHz | 9 for frequency range 1 |

TABLE 12

| u/SCS | PUSCH preparation time N2 [symbols] |
|---|---|
| 0/15 kHz | 5 |
| 1/30 kHz | 5.5 |
| 2/60 kHz | 11 for frequency range 1 |

TABLE 13

| u/SCS | PUSCH preparation time N2 [symbols] |
|---|---|
| 0/15 kHz | 10 |
| 1/30 kHz | 12 |
| 2/60 kHz | 23 |
| 3/120 kHz | 36 |

For example, N2 capability defined for a PUSCH may be reused without change, or a value (e.g., ceil(T_proc*R) or ceil(T_proc−d)) to which a certain ratio R or offset d of a processing time T_proc determined through the N2 capability may be used to determine a predetermined time N. The value may be assumed to be a processing time of a UL CI. Here, R and d may be a promised or predefined value or may be a value determined via L1 signaling and/or higher layer signaling of the BS.

<Implementation A2> When implementation A1 is used or when the UE selectively monitors the UL CI based on specific UL transmission pre-indicated and/or preconfigured to the UE to be performed similarly to implementation A1, the UE may consider only first X symbols (or start of UL transmission) of the specific UL transmission in some implementations. That is, the UE and the BS may use a position of a radio resource region allocated for the specific UL transmission to transmit a valid MO, and in this case, whether a MO is valid may be determined based on only a predetermined number of symbols from a first symbol of the radio resource region allocated for the specific UL transmission.

Accordingly, the UL CI may be detected and interpreted prior to a start time of UL transmission canceled, so as to allow the UE to cancel entire UL transmission. In addition, transmission cancellation may always occur in a front part of UL transmission, thereby preventing UL transmission from being stopped midway. For example, it may be assumed that only first X symbols used for certain transmission are transmission resources, and then whether each condition considered in implementation A1 is satisfied may be checked.

In some implementations, implementation A2 may be used only in a specific type of UL transmission. For example, implementation A2 may be used only in a PUCCH and/or a PRACH. This may be to always cancel entire transmission for a corresponding transmission channel because it is difficult to decode the PUCCH or the PRACH when UL transmission is stopped midway.

In the case of UL transmission to which implementation A2 is applied, when the UE is indicated to cancel first X symbols of transmission (or start of UL transmission), the UE may cancel entire corresponding transmission.

The X may be a promised or predefined value or may be a value determined via L1 signaling and/or higher layer signaling of the BS.

<Implementation A3> When implementation A1 is used or when the UE selectively monitors the UL CI based on specific UL transmission pre-indicated and/or preconfigured to the UE to be performed similarly to implementation A1, the specific UL transmission may include at least one of UL transmissions listed below in some implementations. This may be to prevent cancellation of URLLC traffic through a UL CI and to prevent unnecessary UL CI monitoring when the UL CI is not capable of cancelling the URLLC traffic.

PUSCH for low priority traffic;
PUCCH for low priority traffic;
SRS transmission for low priority traffic;
PRACH except for initial access purpose (e.g., PRACH for receiving a UL grant).

The channel/transmission for low priority traffic may refer to eMBB traffic or non-URLLC traffic. Alternatively, when priority for each channel/transmission is indicated or configured through L1 signaling, higher layer signaling, a DCI format, CRC scrambling, RNTI, CORESET, and/or a search space, the channel/transmission may refer to a channel/transmission indicated or configured with priority of a specific level or less (e.g., low priority when two priorities are used).

When it is difficult to distinguish priority of each traffic or priority for each channel/transmission is indicated or configured through L1 signaling and/or higher layer signaling, the UE may assume that the corresponding channel/transmission is channel/transmission with low priority. In other words, the UE may consider at least one of the listed transmissions to use implementation A1 (e.g., to determine the validity of a MO) without distinguishing traffic priorities. According to the method, when a UL CI is transmitted UE-statically or group-commonly without being broadcast, the BS may transmit the UL CI in consideration of UL transmission scheduled to the corresponding UE, and thus URLLC traffic may be advantageously considered not to be canceled at a BS level as possible. This method may simplify implementation of a UE.

<Implementation A3-1> When implementation A1 is used or when the UE selectively monitors the UL CI based on specific UL transmission pre-indicated and/or preconfigured to the UE to be performed similarly to implementation A1, if certain UL transmission corresponding to the specific UL transmission corresponds to at least one of all or some of the cases listed below in some implementations, the corresponding transmission may be excluded from the specific UL transmission. In other words, the corresponding UL transmission may not be considered when implantation A1 is used. Accordingly, when certain transmission is canceled by the UL CI, the validity of a UL CI MO may not be determined based on the corresponding UL transmission any longer, thereby minimizing unnecessary UL CI monitoring. In particular, even if the UL CI indicates cancellation of only a partial region of a resource, when the UE cancels all transmissions or transmission after the indicated region, unnecessary UL CI monitoring may be minimized.

When a partial radio resource region of the specific transmission is canceled at least once (in other words, when being indicated by a UL CI);

When an entire radio resource region of the specific transmission is canceled;

When an entire DMRS region of the specific transmission is canceled;

When the specific transmission is a PUCCH or a PRACH and a partial radio resource region is cancelled; and/or When a partial radio resource region of the specific transmission is cancelled and phase discontinuity in the corresponding radio resource occurs (e.g., when a radio resource of M or more symbols is canceled and phase discontinuity occurs. Here, a symbol length M may be a promised or predefined value or may be determined through the capability of the UE).

<Implementation A4> When the UL CI indicates a certain time and/or frequency resource region, and in more detail, when the UL CI indicates a part of a certain reference resource region, the UE may receive an indication or a configuration of time and/or frequency granularity of the UL CI in some implementations. A value indicated by the UL CI or a bit field of the UL CI may correspond one-to-one or one-to-many to each symbol group and/or PRB subset of the reference resource region divided according to the granularity. In some implementations of the present disclosure, the following may be considered to determine a symbol group and a PRB subset according to given time/frequency granularity (refer to implementations A4-1 and A4-2).

Accordingly, when a reference resource region of each UL CI is determined based on a UL CI MO, the same resource grid may be used in respective UL CIs to indicate the same time/frequency region even in different UL CI MOs. Thus, when the BS intends to cancel UL transmission in a certain resource region by a UL CI, redundant cancellation of a wide region may be prevented.

<Implementation A4-1> When the UE determines a symbol group according to given time granularity, a system frame number SFN=0 may be used as a reference point of a resource grid, and the reference resource region may be divided into symbol groups.

For example, when the given time granularity is P and the reference resource region is present at $N^{start}_{ref,time}$ away from SFN=0 and has a length $N^{size}_{ref,time}$, the reference resource region may include the following symbol groups.

A first symbol group may start at $N^{start}_{ref,time}$ from SFN=0.

The length of the first symbol group may be P−($N^{start}_{ref,time}$ mod P).

The length of a last symbol group may be ($N^{start}_{ref,time}$+$N^{size}_{ref,time}$)mod P. When the corresponding value is 0 or is equal to or less than 0, the length of the last symbol group may be P.

The length of the other symbol groups may be P.

The symbol groups may be consecutively mapped to UL and/or flexible symbols or may be mapped to contiguous symbols without distinguishing a transmission direction. When the symbol groups are mapped to the contiguous symbols without distinguishing a transmission direction, if at least one UL or flexible symbol is not present in the corresponding symbol group, the corresponding symbol group may be excluded from the reference resource region.

$N^{start}_{ref,time}$ may be derived through the following from a start symbol of the reference resource region: $N^{start}_{ref,time}$= (SFN*numberOfSlotsPerFrame*numberOfSymbolsPerSlot+ slot number in the frame*numberOfSymbolsPerSlot+symbol number in the slot). Here, numberOfSlotsPerFrame and numberOfSymbolsPerSlot are the number of consecutive slot for each frame and the number of consecutive symbols for each slot, respectively. The "slot number in the frame" may be a slot index in a frame including a start symbol of a reference resource region, and the "symbol number in the slot" may be a start symbol index in a slot including a start symbol of a reference resource region.

<Implementation A4-2> When the UE determines a PRB subset according to given frequency granularity, a common resource block 0 may be used as a reference point of a resource grid, and the reference resource region may be divided into PRB subsets.

For example, when the given frequency granularity is P and the reference resource region is present at $N^{start}_{ref,freq}$ away from the common resource block 0 and has a length $N^{size}_{ref,freq}$, the reference resource region may include the following PRB subsets.

A first PRB subset may start at $N^{start}_{ref,freq}$ away from the common resource block 0.

The length of the first PRB subset may be P−($N^{start}_{ref,freq}$ mod P).

The length of a last PRB subset may be ($N^{start}_{ref,freq}$+ $N^{start}_{ref,freq}$) mod P. When the corresponding value is 0 or is equal to or less than 0, the length of the last PRB subset may be P.

The length of the other PRB subsets may be P.

When the reference resource region is determined by an active BWP, $N^{start}_{ref,freq}$ may be determined by a value $N'^{start}_{ref,freq}$ based on $N^{start}_{BWP}$ that is a start time of an active BWP from the common resource block 0. For example, $N^{start}_{ref,freq}$=$N^{start}_{BWP}$+$N'^{start}_{ref,freq}$.

<Implementation A5> When a UL CI indicates a certain time and/or frequency resource region, and in more detail, when the UL CI indicates a part of a certain reference resource region, the UE may assume that an interval of configured UL CI MOs is always an integer multiple of granularity indicating a region of a reference resource (in particular, a time reference resource), in which transmission is canceled, in some implementations. Thus, when reference resource regions are determined based on an interval of the UL CI MOs, the same time/frequency resource region may be indicated by different UL CIs. Accordingly, when the BS intends to cancel transmission in a certain resource region by a UL CI, redundant cancellation of a wide region may be prevented.

In some implementations, for example, when one UL CI indicates a region of a reference resource region, in which transmission is canceled, in units of X symbols, the UE may assume that MOs in which the UL CI is to be received is configured at an interval of an integer multiple of X. Alternatively, when one UL CI indicates a region of a reference resource region, in which transmission is canceled, in units of X symbols, the UE may not assume that MOs in which the UL CI is to be received are not configured at an interval of an integer multiple of X.

<Implementation A6> When there is an available DMRS in a forepart (i.e., a forepart of remaining resources that are not indicated by a UL CI among resources of UL transmission) of UL transmission after cancellation and there is a sufficient timing gap between the UL CI and start of the cancelled UL transmission (i.e., start of UL resources prior to cancellation among UL resources of UL transmission canceled by the UL CI), the forepart of UL transmission after cancellation may be transmitted.

Resumption of UL transmission reusing the remaining resource again after apart of the UL transmission is canceled, that is, "stop and resuming" of the UL transmission may not be supported. Accordingly, when UL cancellation is indicated once, the UE may drop UL transmission on indicated and subsequent resources. It may be necessary to clarify a UE behavior for a forepart of UL transmission. Even if UL transmission partially overlaps with resources indicated by a UL CI, it may be considered to drop the entire UL transmission in a slot. However, this may be inefficient when a resource reserved for UL transmission of another UE (i.e., a resource on which UL transmission of another UE is canceled) spans only one or two OFDM symbols. When there is an available DMRS (which is not canceled by a UL CI) in a forepart of UL transmission and there is a sufficient timing gap between the UL CI and start of the cancelled UL transmission (i.e., start of UL resources prior to cancellation by the UL CI), it may be advantageous to transmit the forepart of UL transmission.

For example, when the time/frequency domain is indicated to the UE by the UL CI, the UE may cancel (drop, puncture, or rate-match) UL transmission in the time/frequency domain and subsequent resources, and the BS may assume this UE operation. When the forepart of UL transmission has an available DMRS symbol, the BS may receive a part of the UL transmission. Thus, at least in the case of a PUSCH, when the BS receives a forepart of UL transmission and the forepart of the UL transmission has an available DMRS symbol, the BS may indicate CBG-level retransmission for the remaining part in order to receive the remaining part.

<Implementation A7> The minimum processing time for a UL CI may be given by one of values (e.g., $T_{proc,2}$ stated in 3GPP TS 38.214) included in minimum processing time capability for a PUSCH of an SCS configuration of a DL BWP in which the UE receives a PDCCH with the UL CI. The UE may report whether a certain processing time (type 1 processing time and/or type 2 processing time) is available for each SCS configuration to the BS, and the BS may configure one of the type 1 and type 2 processing times to the UE. For example, the UE and the BS may use a PUSCH processing time available by the UE among SCS values of a DL BWP in which a PDCCH is received and may use one of the type 1 and type 2 processing times when both of the type 1 and type 2 processing times are available. In order for different UEs to have the same timing gap, the minimum processing time for the UL CI may be used as a timing gap between an ending symbol of PDCCH CORESET and the beginning of the reference time region.

When UL CI signaling is group-common, it may not be necessary to configure different offsets for different UEs. In the case of assumption of SCS for deriving a minimum processing time (e.g., a value of $T_{proc,2}$) for a UL CI, there is no transmission preparation, and thus it may be reasonable to consider only the SCS of the DL BWP carrying the UL CI. When the UE considers DL and UL numerologies for a PUSCH/PUCCH, different UEs having UL BWPs of different numerologies may have different timing gaps between an ending symbol of PDCCH CORESET and start of the reference time region, thereby causing redundant cancellation.

<Implementation A7-1> A minimum processing time for a UL CI and a timing gap between an ending symbol of PDCCH CORESET and start of a reference time region may be determined using the smallest value among SCSs provided together by a plurality of UEs that receive the same UL CI.

UEs in a cell may recognize information on SCSs available in the cell through frequencyInfoUL of UplinkConfigCommonSIB IE that is commonly received through RRC signaling of the BS, that is, an RRC parameter received through FrequencyInfoUL-SIB IE (refer to 3GPP TS 38.331). In addition, UEs that receive the same UL CI may receive the same PDCCH, and thus SCSs of DL BWPs in which the UL CI is received may be the same.

In some implementations of the present disclosure, in order to determine the size or length of the time and/or frequency domain of the reference resource region used in the UL CI, the smallest SCS among these SCSs may be selected. In detail, a smaller value of the SCS configured through FrequencyInfoUL-SIB IE and SCSs of a PDCCH on which the UL CI is received may be used to assume a processing time of the UL CI. For example, for a serving cell, the UE may determine the first symbol of a reference UL resource for the UL CI to be the first symbol that is after $T_{proc,2}$+d from the end of reception of a PDCCH in which the UE detects the UL CI, where d may be provided according to delta offset d. The delta offset d may be provided to the UE through RRC signaling of the BS. $T_{proc,2}$ may correspond to PUSCH processing capability 2 assuming $d_{2,1}$=0 with u being the smallest SCS configuration among SCSs provided by the FrequencyInfoUL-SIB and a SCS of an active DL BWP for monitoring a PDCCH for UL CI detection for a serving cell by the UE is assumed.

Alternatively, the BS may explicitly indicate one of the SCSs to be used in assumption of a UL CI processing time through an RRC parameter. Thus, a SCS to be used may be directly configured, or whether to use a smallest SCS among the SCSs included in the FrequencyInfoUL-SIB or a SCS of a DL BWP in which the UL CI is received may be configured. In other words, the BS may directly/indirectly configure a set of SCSs for the UL CI to the UE and the UE may select the smallest SCS thereamong.

Accordingly, the UE and the BS may select the smallest possible SCS, and thus the UE may ensure a sufficient UL CI processing time, thereby lowering UE implementation difficulty.

<Implementation A8> When the UL CI indicates a certain time and/or frequency resource region, and in more detail, when the UL CI indicates a part of a certain reference resource region, the length of the reference resource region, in particular, the length in the time domain may be determined as a period or an interval of UL CI MOs or an integer multiple of the period or the interval. Thus, one UL CI may use a resource of an interval of UL CI MOs or more as a reference resource region, and thus UL CI(s) may indicate an entire resource region available by the UE.

When the UL CI MOs are determined through a search space configuration of an existing system, it may be difficult to specify an interval of the UL CI MOs. A MO configured through a search space configuration included in RRC configuration information is determined according to a monitoring pattern in one slot and a period of a slot-level, and thus when a plurality of UL CI MOs is configured in one slot, intervals between the UL CIs may not be the same. Accordingly, in this case, in order to determine an interval or a period of UL CI MOs, the following method may be considered.

An actually configured UL CI interval may be disregarded, and an interval between MOs of the UL CI may be determined as a search space period (e.g., a value of monitoringSlotPeriodicityAndOffset in SearchSpace IE). In order to effectively use this method, when a search space period is greater than 1, it may be assumed that only one UL CI MO is configured in a slot. In other words, it may be assumed that two or more UL CI MOs are not configured in one slot.

An interval of UL CI MOs may be determined as an average of actually configured UL CI interval. For example, when N UL CI MOs are configured in one slot, N different intervals may be configured for the respective UL CI MOs, and in this case, a period/interval for determining the reference resource region may be an average of the intervals.

<Implementation A9> When the UL CI indicates a certain time and/or frequency resource region, and in more detail, when the UL CI indicates a part of a certain reference resource region, the length of the reference resource region, in particular, the length in the time domain may be different for each UL CI MO. Accordingly, when different UL CI MOs are spaced apart at irregular intervals, an entire UL resource region may be effectively represented through UL CI(s). In this case, in order to determine length of the UL CI reference resource region or the reference resource region, at least one method of the following may be considered.

The length of a reference resource region of a UL CI received in a certain UL CI MO may be determined as an interval to a next UL CI MO from the corresponding UL CI MO or a integer multiple of the corresponding interval. For example, an interval from a start or last symbol of a CORESET in which a certain UL CI MO is received to a start or last symbol of a CORESET in which a next UL CI MO is received or an integer multiple of the corresponding interval may be determined as the reference resource region or the length of the reference resource region. In this case, the following UL CI MO may be determined using the following method.

Option 1: A UL CI MO that is the closest to (i.e., the first one in time after) a corresponding UL CI MO among UL CI MOs in which reception is possible in consideration of a TDD configuration (e.g., TDD-UL-DL-Configdedicated and TDD-UL-DL-Configcommon) and a slot format indication, received by the UE, may be determined as the next UL CI MO. Accordingly, in consideration of a UL CI MO in which actual reception of the UE occurs, each UL CI MO(s) may represent an entire UL resource region.

Option 2: A UL CI MO that is the closest to (i.e., the first one in time after) a corresponding UL CI MO among UL CI MOs in which reception is possible in consideration of a TDD configuration (e.g., TDD-UL-DL-Configdedicated and TDD-UL-DL-Configcommon) received by the UE may be determined as the next UL CI MO. Accordingly, the reference resource region may be determined semi-statically.

Option 3: A UL CI MO that is the closest to (i.e., the first one in time after) a corresponding UL CI MO among UL CI MOs in which reception is possible in consideration of a cell-common TDD configuration (e.g., TDD-UL-DL-Configcommon) received by the UE may be determined as the next UL CI MO. Thus, a group of UEs for monitoring the UL CI may have the same reference resource region or reference resource region length.

The length of the reference resource region of the UL CI received in a certain UL CI MO may be determined as a search space period (e.g., a value of monitoringSlotPeriodicityAndOffset in SearchSpace IE) or integer N times of the corresponding time length. In this case, N may be determined using the following method.

Option 1: In consideration of a TDD configuration (e.g., TDD-UL-DL-Configdedicated and TDD-UL-DL-Configcommon) and a slot format indication, received by the UE, the number of non-available UL CI MOs (e.g., overlapping with a UL symbol) to a next UL CI MO in which reception is possible or the number of slots in which a UL CI MO is configured but an available UL CI MO (e.g., in a DL symbol) is not present may be determined as N. Accordingly, in consideration of a UL CI MO in which actual reception of the UE occurs, the UL CI MO(s) may represent an entire resource region.

Option 2: In consideration of a TDD configuration (e.g., TDD-UL-DL-Configdedicated and TDD-UL-DL-Configcommon) received by the UE, the number of non-available UL CI MOs (e.g., overlapping with a UL symbol) to a next UL CI MO in which reception is possible or the number of slots in which a UL CI MO is configured but an available UL CI MO (e.g., in a DL symbol) is not present may be determined as N. Accordingly, the reference resource region may be determined semi-statically.

Option 3: In consideration of a cell-common TDD configuration (e.g., TDD-UL-DL-Configcommon) received by the UE, the number of non-available UL CI MOs (e.g., overlapping with a UL symbol) to a next UL CI MO in which reception is possible or the number of slots in which a UL CI MO is configured but an available UL CI MO (e.g., in a DL symbol) is not present may be determined as N. Thus, a group of UEs for monitoring the UL CI may have the same reference resource region or reference resource region length.

In Terms of BS

Hereinafter, the implementations described above in terms of the UE will be described again in terms of the BS.

Figure 12:
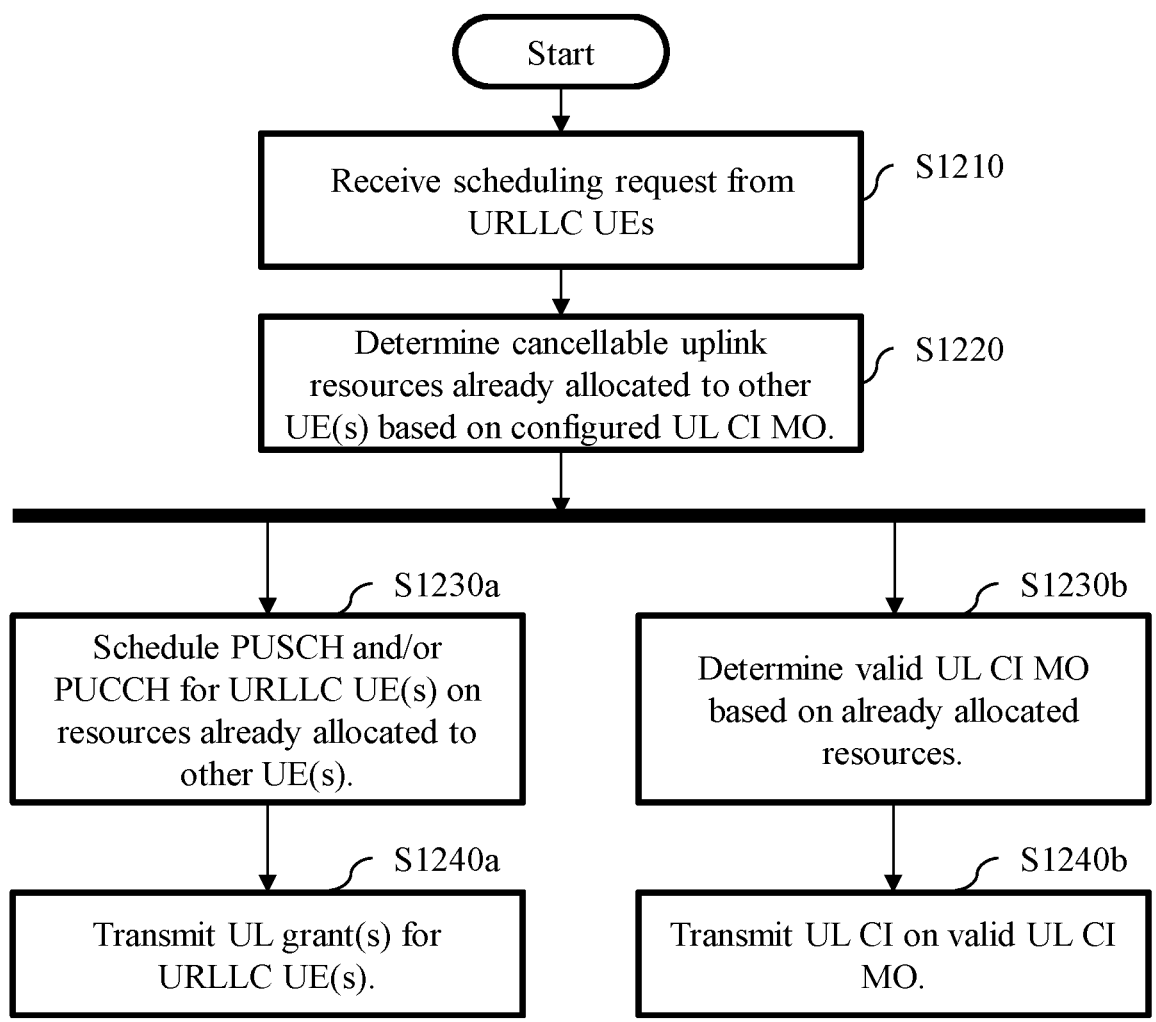
FIG. 12 is a diagram showing a UE operation according to some implementation(s) of the present disclosure.

FIG. 12 is a diagram showing a UE operation according to some implementation(s) of the present disclosure. In the present disclosure, the BS may transmit a UL CI of the UE only in a valid MO in which the UE is capable of canceling UL transmission. Hereinafter, an example of some implementation(s) of the present disclosure will be described.

(1) The BS may receive a scheduling request from a URLLC UE (S1210).

The operation of receiving UL scheduling from the BS by the UE may be implemented by, for example, the device of FIG. 2 or 3. For example, referring to FIG. 2, the one or more processors 102 may control the one or more transceivers 106 and/or the one or more memories 104 to receive the scheduling request from the UE and the one or more transceivers 106 may receive the scheduling request from the UE.

(2) The BS may determine a resource that can be canceled among resources pre-allocated to other UE(s) based on a UL CI MO configured to the other UE(s) (S1220). For example, the BS may recognize a radio resource region to be canceled by the BS includes a resource pre-allocated to eMBB UE(s) using the UL CI in the configured UL CI MO. Thus, the BS may recognize whether a valid UL CI MO is present for a resource pre-allocated to the UE.

The operation of recognizing a resource that can be canceled among pre-allocated resources based on the UL CI MO configured to the BS may be implemented by, for example, the device of FIG. 2 or 3. For example, the one or more processors 102 may recognize the resource that can be canceled among the pre-allocated resources based on the UL CI MO configured to the eMBB UE by the BS.

(3) The BS may (a) allocate, to the URLLC UE, a resource that can be canceled among pre-allocated resources for the eMBB UE (S1230a) and may (b) determine a valid UL CI MO for UL CI transmission based on a resource pre-allocated to the eMBB UE (S1230b).

For example, the BS may recognize a valid MO among a plurality of UL MOs in order to transmit a UL CI. For example, the BS may recognize a valid MO using the method described in implementations B1 and/or B2 in order to transmit a UL CI for informing the eMBB UE of the resource canceled for allocation to the URLLC UE among the pre-allocated resources. In detail, as described above in implementations B1-1 and/or B1-2, an MO that satisfies a specific condition may be recognized as a valid MO, and in this case, the specific condition may be the same as or similar to a condition for the UE to recognize the valid MO. In addition, only a part of specific UL transmission may be subject to cancellation.

For example, the BS may configure UL transmission cancellation to occur only in a predetermined number of symbols from the first symbol of specific UL transmission. In some implementations of the present disclosure, an interval of a plurality of configured MOs may be determined according to implementations B8 and/or B9 below. For example, an interval of MOs may be determined by a search space period (e.g., a value of monitoringSlotPeriodicityAndOffset in SearchSpace IE) or may be determined as an average of actually configured UL CI intervals. For example, when N UL CI MOs are configured in one slot, different N intervals may be configured for each UL CI MO, and in this case, a period/interval for determining a reference resource region may be an average of the intervals.

The operation of (a) allocating, to the URLLC UE, a resource that can be canceled among pre-allocated resources for the eMBB UE and (b) determining a valid UL CI MO for UL CI transmission based on a resource pre-allocated to the eMBB UE by the BS may be implemented by the device of FIG. 2 or 3. For example, referring to FIG. 2, the one or more processors 102 may control the BS (a) to allocate, to the URLLC UE, the resource that can be canceled among pre-allocated resources for the eMBB UE and (b) to determine a valid UL CI MO for UL CI transmission based on a resource pre-allocated to the eMBB UE.

(4) The BS may (a) transmit a UL grant for resource allocation to the URLLC UE (S1240*a*) and may (b) transmit a UL CI for cancellation of transmission to the eMBB UE, to the valid UL CI MO (S1240*b*).

In some implementations of the present disclosure, in order to determine a reference resource region related to the UL CI or the length of the reference resource region, at least one of the following may be considered.

The length of the reference resource region of the UL CI transmitted in a certain UL CI MO may be determined as an interval to a next UL CI MO from a corresponding UL CI MO or an integer multiple of the corresponding interval. For example, an interval from a start or last symbol of a CORESET in which a certain UL CI MO is received to a start or last symbol of a CORESET in which a next UL CI MO is received or an integer multiple of the corresponding interval may be determined as the reference resource region or the length of the reference resource region. In this case, the following UL CI MO may be determined using the following method.

Option 1: A UL CI MO that is the closest to (i.e., the first one in time after) a corresponding UL CI MO among available UL CI MOs in consideration of a TDD configuration (e.g., TDD-UL-DL-Configdedicated and TDD-UL-DL-Configcommon) and a slot format indication, transmitted by the BS may be determined as the next UL CI MO. Accordingly, this option makes it possible that UL CI MO(s) may represent an entire UL resource region in consideration of a UL CI MO in which actual reception of the UE occurs.

Option 2: A UL CI MO that is the closest to (i.e., the first one in time after) a corresponding UL CI MO among available UL CI MOs in consideration of a TDD configuration (e.g., TDD-UL-DL-Configdedicated and TDD-UL-DL-Configcommon) transmitted by the BS may be determined as the next UL CI MO. Accordingly, the reference resource region may be determined semi-statically.

Option 3: A UL CI MO that is the closest to (i.e., the first one in time after) a corresponding UL CI MO among available UL CI MOs in consideration of a cell-common TDD configuration (e.g., TDD-UL-DL-Configcommon) transmitted by the BS may be determined as the next UL CI MO. Thus, a group of UEs for monitoring the UL CI may have the same reference resource region or reference resource region length.

The length of the reference resource region of the UL CI transmitted in a certain UL CI MO may be determined as a search space period (e.g., a value of monitoringSlotPeriodicityAndOffset in SearchSpace IE) or integer N times of the corresponding time length. In this case, N may be determined using the following method.

Option 1: In consideration of a TDD configuration (e.g., TDD-UL-DL-Configdedicated and TDD-UL-DL-Configcommon) and a slot format indication, transmitted by the BS, the number of non-available UL CI MOs (e.g., overlapping with a UL symbol) to a next available UL CI MO or the number of slots in which a UL CI MO is configured but an available UL CI MO (e.g., in a DL symbol) is not present may be determined as N. Accordingly, in consideration of a UL CI MO in which actual reception of the UE occurs, the UL CI MO(s) may represent an entire resource region.

Option 2: In consideration of a TDD configuration (e.g., TDD-UL-DL-Configdedicated and TDD-UL-DL-Configcommon) transmitted by the BS, the number of non-available UL CI MOs (e.g., overlapping with a UL symbol) to a next available UL CI MO or the number of slots in which a UL CI MO is configured but an available UL CI MO (e.g., in a DL symbol) is not present may be determined as N. Accordingly, the reference resource region may be determined semi-statically.

Option 3: In consideration of a cell-common TDD configuration (e.g., TDD-UL-DL-Configcommon) transmitted by the UE, the number of non-available UL CI MOs (e.g., overlapping with a UL symbol) to a next available UL CI MO or the number of slots in which a UL CI MO is configured but an available UL CI MO (e.g., in a DL symbol) is not present may be determined as N. Thus, a group of UEs for monitoring the UL CI may have the same reference resource region or reference resource region length.

The operation of (a) transmitting, by a BS, a UL grant for resource allocation to the URLLC UE and (b) transmitting, in the valid UL CI MO by the BS, a UL CI for cancellation of transmission to the eMBB UE may be implemented by, for example, the device of FIG. 2 or 3. For example, referring to FIG. 2, the one or more processors 102 may control the one or more transceivers 106 and/or the at least one memory 104 (*a*) to transmit a UL grant for resource allocation to the URLLC UE and (b) to transmit, in the valid UL CI MO, a UL CI for cancellation of transmission to the eMBB UE and the one or more transceivers 106 may (a) transmit a UL grant for resource allocation to the URLLC UE and (b) transmit, in the valid UL CI MO, a UL CI for cancellation of transmission to the eMBB UE, as described in implementations B1 to B9.

With regard to FIG. 12, the following may be additionally considered for a BS operation.

<Implementation B1> When the BS configures the UE to monitor a UL CI, a plurality of MOs in which the UL CI is to be transmitted to the UE may be configured through a specific parameter (or a specific RRC parameter) included in RRC configuration information. The BS may transmit the UL CI by selectively using a valid MO of the configured MO(s).

The specific parameter may be ControlResourceSet IE and/or SearchSpace IE. In particular, the SearchSpace IE may be used to configure whether a UE can receive a UL CI in a MO indicated by a specific parameter. For example, the SearchSpace IE may be a parameter related to whether the UL CI is likely to be received in the indicated MO, and the UE may recognize the MO in which the UL CI is likely to be received through the SearchSpace IE transmitted through the RRC configuration.

The ControlResourceSet IE may be a parameter related to a set of resources in which the UL CI is transmitted/received. For example, the UE may receive control information from the BS through at least one resource included in the ControlResourceSet IE. That is, the UE may receive a UL CI by monitoring whether the UL CI is transmitted through a resource region configured by the ControlResourceSet IE in the MO indicated by the SearchSpace IE.

In other words, the BS may transmit the UL CI through a plurality of MOs and a plurality of resources that are configured through specific parameters (e.g., SearchSpace IE and ControlResourceSet IE) transmitted through RRC configuration information.

For example, the BS may transmit a UL CI by selectively using at least one valid MO among a plurality of configured MOs. In some implementations of the present disclosure, the BS may transmit the UL CI to the eMBB UE by using a valid MO as much as possible because it is possible to improve reliability by transmitting the UL CI multiple times for the URLLC. In some implementations of the present disclosure, the BS may arbitrarily select MOs among at least one valid MO and may transmit the UL CI.

As such, when the UL CI is transmitted by selectively using at least one valid MO, if only a specific MO is selected among MOs, the case in which the BS is not capable of transmitting a UL CI in a specific MO by PDCCH blocking that occurs due to scheduling of another UE may be prevented.

The valid MO may be determined based on UL transmission pre-indicated and/or preconfigured to the UE to be performed by the BS. For example, in this case, the valid MO may be a MO that satisfies at least one of the following. Alternatively, in order to monitor only fewer MOs to minimize power consumption and implementation difficulty of the UE, the validity of the MOs may be determined more strictly. That is, in order to reduce the number of MOs that the UE needs to monitor, whether the MO is valid may be restrictedly determined. In another example, the MO may be determined to be valid only when all of the following conditions are satisfied.

<Implementation B1-1> (Condition 1) When a UL CI indicating prescheduled specific UL transmission or some of radio resources used in the corresponding transmission can be transmitted in a certain UL CI MO, the BS may determine that the condition 1 is satisfied. According to the condition 1, the UE may receive only a UL CI that is capable of indicating a UL radio resource in which the UE is scheduled, and thus the corresponding UE may be prevented from unnecessarily monitoring the UL CI.

In some implementations of the present disclosure, when a UL CI is capable of indicating prescheduled transmission through a HARQ process ID or the like, the BS may determine that a UL CI MO present between a time of transmitting a scheduling message for the UL transmission and end of transmission of the UL transmission satisfies the condition 1. This may be useful when the BS cancels specific scheduling indicated by the UL CI.

Alternatively, when the UL CI indicates a certain time and/or frequency resource region, and in more detail, when the UL CI indicates a part of a certain reference resource region, the BS may determine that the corresponding UL CI MO satisfies the condition 1 when a resource region used in prescheduled specific UL transmission is included in a reference resource region of a UL CI to be received in a certain UL CI MO. Referring to FIG. 10, when UL transmission #2, #3, or #4 is dynamically scheduled to the UE through DCI or is semi-statically scheduled via RRC, the BS may transmit a UL CI for UL transmission #2, #3, or #4 in a MO1 for a UL CI. In contrast, UL transmission #1 and UL transmission #5 may not overlap with reference resource region #1 (in terms of time) in which transmission is to be cancelled by the UL CI received in the MO1, and thus even if UL transmission #1 or UL transmission #5 is scheduled to the UE, the BS may not transmit the UL CI in the MO1 for UL transmission #1 or UL transmission #5.

For example, when a UL CI to be transmitted in a certain UL CI MO has a certain frequency domain as the reference resource region, the BS may determine that the corresponding satisfies the condition 1 when prescheduled specific UL transmission uses a part of the corresponding reference resource region.

In another example, when Y symbols after X symbols from a time of transmitting the UL CI correspond to a reference resource region in the time domain, the BS may determine that a UL CI MO present between a time before X+Y symbols from start of prescheduled specific UL transmission and a time before X symbols from end of the corresponding UL transmission satisfies the condition 1. In other words, when a time domain reference resource region of a UL CI to be transmitted in a certain UL CI MO correspond to Y symbols after X symbols from the time of transmitting the UL CI, if i) start of prescheduled specific UL transmission is a time before X+Y symbols from the time of transmitting the UL CI and ii) end of the specific UL transmission is a time after X symbols from the time of transmitting the UL CI, the corresponding UL CI MO may be determined to satisfy the condition 1. Referring to FIG. 10, with regard to UL transmissions #2, #3, and #4, the MO1 may be determined to satisfy the condition 1. Referring to FIG. 11, it may be determined that the MO2 is valid for UL CI transmission for UL transmission #x and the MO1 and the MO2 are not valid for UL CI monitoring for the UL transmission #x. This method may be useful when the BS intends to cancel UL transmission using the indicated resource region or a part of the transmission.

In some implementations of the present disclosure, in order to indicate a UL CI for more approximately representing a resource region in which specific UL transmission is canceled, when a resource region used by prescheduled specific UL transmission is included as K symbols or more in the reference resource region of a UL CI to be transmitted in a certain UL CI MO, the BS may determine that the corresponding UL CI MO satisfies the condition 1. This may be to save PDCCH resources and to reduce the possibility of PDCCH collision by reducing the number of cases in which the BS transmits a plurality of UL CIs to cancel one transmission. Here, K may be a promised or predefined value or may be a value determined by L1 signaling and/or higher layer signaling of the BS.

The reference resource region (e.g., X and Y for the time domain) may be a promised or predefined region for each domain as a time/frequency resource region or may be a resource region determined by L1 signaling and/or higher layer signaling of the BS.

<Implementation B1-2> (Condition 2) When a certain UL CI MO (or start or end of a MO) is spaced apart from a prescheduled specific UL radio resource (or start or end of a radio resource) by a predetermined time (N symbols), the BS may determine that the UL CI MO is a MO that satisfies the condition 2. The condition 2 may be useful to ensure a processing time required for decoding, information interpretation, and/or UL transmission cancellation process in a process of receiving a UL CI in a MO by the UE.

When the condition 2 is considered, the predetermined N may be determined according to at least one of the following.

Processing capability related to a UL CI of the corresponding UE;
Timing advance of the corresponding UE;
Promised or predefined value; and/or
A value indicated and/or configured to the corresponding UE through L1 signaling and/or higher layer signaling of the BS.

The processing capability related to the UL CI of the UE may be newly defined for the UL CI or existing processing capability of the UE, defined for a PDSCH or a PUSCH, may be reused. For example, N2 capability defined for a PUSCH may be reused without change, or a value (e.g., ceil(T_proc*R) or ceil(T_proc−d)) to which a certain ratio R or offset d of a processing time T_proc determined through the N2 capability may be used to determine a predetermined time N. The value may be assumed to be a processing time of a UL CI. Here, R and d may be a promised or predefined value or may be a value determined via L1 signaling and/or higher layer signaling of the BS.

<Implementation B2> When implementation B1 is used or when the BS selectively uses the UL CI based on specific UL transmission pre-indicated and/or preconfigured to the UE to be performed similarly to implementation B1, the BS may consider only first X symbols (or start of UL transmission) of the specific UL transmission in some implementations. Accordingly, the UL CI may be detected and interpreted prior to a start time of UL transmission canceled, so as to allow the UE to cancel entire UL transmission. In addition, transmission cancellation may always occur in a front part of UL transmission, thereby preventing UL transmission from being stopped midway. For example, the BS and the UE may assume that only first X symbols used for certain transmission are transmission resources and then may check whether each condition considered in implementation B1 is satisfied.

In some implementations, implementation B2 may be used only in a specific type of UL transmission. For example, implementation B2 may be used only in a PUCCH and/or a PRACH. This may be to always cancel entire transmission for a corresponding transmission channel because it is difficult to decode the PUCCH or the PRACH when UL transmission is stopped midway.

In the case of UL transmission to which implementation B2 is applied, when the UE is indicated to cancel first X symbols of transmission (or start of UL transmission), the UE may cancel entire corresponding transmission.

The X may be a promised or predefined value or may be a value determined via L1 signaling and/or higher layer signaling of the BS.

<Implementation B3> When implementation B1 is used or when the BS selectively monitors the UL CI based on specific UL transmission pre-indicated and/or preconfigured to the BS to be performed similarly to implementation B1, the specific UL transmission may include at least one of UL transmissions listed below. This may be to prevent cancellation of URLLC traffic through a UL CI and to prevent unnecessary UL CI transmission when the UL CI is not capable of cancelling the URLLC traffic.

PUSCH for low priority traffic;
PUCCH for low priority traffic;
SRS transmission for low priority traffic;
PRACH except for initial access purpose (e.g., PRACH for receiving a UL grant).

The channel/transmission for low priority traffic may refer to eMBB traffic or non-URLLC traffic. Alternatively, when priority for each channel/transmission is indicated or configured through L1 signaling, higher layer signaling, a DCI format, CRC scrambling, RNTI, CORESET, and/or a search space, the channel/transmission may refer to a channel/transmission indicated or configured with priority of a specific level or less (e.g., low priority when two priorities are used).

When it is difficult to distinguish priority of each traffic or priority for each channel/transmission is indicated or configured through L1 signaling and/or higher layer signaling, the UE may assume that the corresponding channel/transmission is channel/transmission with low priority. In other words, the UE may consider at least one of the listed transmissions to use implementation A1 (e.g., to determine the validity of a MO) without distinguishing traffic priorities. According to the method, when a UL CI is transmitted UE-statically or group-commonly without being broadcast, the BS may transmit the UL CI in consideration of UL transmission scheduled to the corresponding UE, and thus URLLC traffic may be advantageously considered not to be canceled at a BS level as possible. This method may simplify implementation of a UE.

<Implementation B3-1> When implementation B1 is used or when the UE selectively monitors the UL CI based on specific UL transmission pre-indicated and/or preconfigured to the BS to be performed similarly to implementation B1, if certain UL transmission corresponding to the specific UL transmission corresponds to at least one of all or some of the cases listed below in some implementations, the corresponding transmission may be excluded from the specific UL transmission. In other words, the corresponding UL transmission may not be considered when implantation B1 is used. Accordingly, when certain transmission is canceled by the UL CI, the validity of a UL CI MO may not be determined based on the corresponding UL transmission any longer, thereby minimizing unnecessary UL CI transmission. In particular, even if the UL CI indicates cancellation of only a partial region of a resource, when the UE cancels all transmissions or transmission after the indicated region, unnecessary UL CI monitoring may be minimized.

When a partial radio resource region of the specific transmission is canceled at least once (in other words, when being indicated by a UL CI);
When an entire radio resource region of the specific transmission is canceled;
When an entire DMRS region of the specific transmission is canceled;

When the specific transmission is a PUCCH or a PRACH and a partial radio resource region is cancelled; and/or When a partial radio resource region of the specific transmission is cancelled and phase discontinuity in the corresponding radio resource occurs (e.g., when a radio resource of M or more symbols is canceled and phase discontinuity occurs. Here, a symbol length M may be a promised or predefined value or may be determined through the capability of the UE).

<Implementation B4> When the UL CI indicates a certain time and/or frequency resource region, and in more detail, when the UL CI indicates a part of a certain reference resource region, the BS may indicate or configure time and/or frequency granularity of the UL CI in some implementations. A value indicated by the UL CI or a bit field of the UL CI may correspond one-to-one or one-to-many to each symbol group and/or PRB subset of the reference resource region divided according to the granularity. In some implementations of the present disclosure, the following may be considered to determine a symbol group and a PRB subset according to given time/frequency granularity (refer to implementations B4-1 and B4-2).

Accordingly, when a reference resource region of each UL CI is determined based on a UL CI MO, the same resource grid may be used in respective UL CIs to indicate the same time/frequency region even in different UL CI MOs. Thus, when the BS intends to cancel UL transmission in a certain resource region by a UL CI, redundant cancellation of a wide region may be prevented.

<Implementation B4-1> When the BS determines a symbol group according to given time granularity indicated or configured to the UE, a system frame number SFN=0 may be used as a reference point of a resource grid, and the reference resource region may be divided into symbol groups.

For example, when the given time granularity is P and the reference resource region is present at $N^{start}_{ref,time}$ away from SFN=0 and has a length $N^{size}_{ref,time}$, the reference resource region may include the following symbol groups.

A first symbol group may start at $N^{start}_{ref,time}$ from SFN=0.

The length of the first symbol group may be P−($N^{start}_{ref,time}$ mod P).

The length of a last symbol group may be ($N^{start}_{ref,time}$+$N^{size}_{ref,time}$) mod P. When the corresponding value is 0 or is equal to or less than 0, the length of the last symbol group may be P.

The length of the other symbol groups may be P.

The symbol groups may be consecutively mapped to UL and/or flexible symbols or may be mapped to contiguous symbols without distinguishing a transmission direction. When the symbol groups are mapped to the contiguous symbols without distinguishing a transmission direction, if at least one UL or flexible symbol is not present in the corresponding symbol group, the corresponding symbol group may be excluded from the reference resource region.

$N^{start}_{ref,time}$ may be derived through the following from a start symbol of the reference resource region: $N^{start}_{ref,time}$= (SFN*numberOfSlotsPerFrame*numberOfSymbolsPerSlot+slot number in the frame*numberOfSymbolsPerSlot+symbol number in the slot). Here, numberOfSlotsPerFrame and numberOfSymbolsPerSlot are the number of consecutive slot for each frame and the number of consecutive symbols for each slot, respectively. The "slot number in the frame" may be a slot index in a frame including a start symbol of a reference resource region, and the "symbol number in the slot" may be a start symbol index in a slot including a start symbol of a reference resource region.

<Implementation B4-2> When the BS determines a PRB subset according to frequency granularity indicated or determined to the UE, a common resource block 0 may be used as a reference point of a resource grid, and the reference resource region may be divided into PRB subsets.

For example, when the given frequency granularity is P and the reference resource region is present at $N^{size}_{ref,freq}$ away from the common resource block 0 and has a length $N^{size}_{ref,freq}$, the reference resource region may include the following PRB subsets.

A first PRB subset may start at $N^{start}_{ref,freq}$ away from the common resource block 0.

The length of the first PRB subset may be P−($N^{start}_{ref,freq}$ mod P).

The length of a last PRB subset may be ($N^{start}_{ref,freq}$+ $N^{size}_{ref,freq}$) mod P. When the corresponding value is 0 or is equal to or less than 0, the length of the last PRB subset may be P.

The length of the other PRB subsets may be P.

When the reference resource region is determined by an active BWP, $N^{start}_{ref,freq}$ may be determined by a value $N'^{start}_{ref,freq}$ based on $N^{start}_{BWP}$ that is a start time of an active BWP from the common resource block 0. For example, $N^{start}_{ref,freq}=N^{start}_{BWP}+N'start_{ref,freq}$.

<Implementation B5> When a UL CI indicates a certain time and/or frequency resource region, and in more detail, when the UL CI indicates a part of a certain reference resource region, the BS may configure an interval of UL CI MOs configured to the UE to be always an integer multiple of granularity indicating a region of a reference resource (in particular, a time reference resource), in which transmission is canceled, in some implementations. Thus, when reference resource regions are determined based on an interval of the UL CI MOs, the same time/frequency resource region may be indicated by different UL CIs. Accordingly, when the BS intends to cancel transmission in a certain resource region by a UL CI, redundant cancellation of a wide region may be prevented.

In some implementations, for example, when one UL CI indicates a region of a reference resource region, in which transmission is canceled, in units of X symbols, the BS may configure MOs, in which the UL CI is to be transmitted, at an interval of an integer multiple of X. Alternatively, when one UL CI indicates a region of a reference resource region, in which transmission is canceled, in units of X symbols, the BS may not configure MOs, in which the UL CI is to be transmitted, at an interval that is not an integer multiple of X.

<Implementation B6> When the BS transmits the UL CI to the UE, if there is an available DMRS in a forepart (i.e., a forepart of remaining resources that are not indicated by a UL CI among resources of UL transmission) of UL transmission after cancellation and there is a sufficient timing gap between the UL CI and start of the cancelled UL transmission (i.e., start of UL resources prior to cancellation among UL resources of UL transmission canceled by the UL CI), the BS may assume that the forepart of UL transmission after cancellation is transmitted.

Resumption of UL transmission reusing the remaining resource again after apart of the UL transmission is canceled, that is, "stop and resuming" of the UL transmission may not be supported. Accordingly, when UL cancellation is indicated once, the UE may drop UL transmission on indicated and subsequent resources. It may be necessary to clarify a UE behavior for a forepart of UL transmission. Even if UL transmission partially overlaps with resources indicated by a UL CI, it may be considered to drop the entire UL transmission in a slot. However, this may be inefficient when a resource reserved for UL transmission of another UE (i.e., a resource on which UL transmission of another UE is canceled) spans only one or two OFDM symbols. When there is an available DMRS (which is not canceled by a UL CI) in a forepart of UL transmission and there is a sufficient timing gap between the UL CI and start of the cancelled UL transmission (i.e., start of UL resources prior to cancellation by the UL CI), it may be advantageous to transmit the forepart of UL transmission.

For example, when the time/frequency domain is indicated to the UE by the UL CI, the UE may cancel (drop, puncture, or rate-match) UL transmission in the time/frequency domain and subsequent resources, and the BS may assume this UE operation. When the forepart of UL transmission has an available DMRS symbol, the BS may receive a part of the UL transmission. Thus, at least in the case of a PUSCH, when the BS receives a forepart of UL transmission and the forepart of the UL transmission has an available DMRS symbol, the BS may indicate CBG-level retransmission for the remaining part in order to receive the remaining part.

<Implementation B7> The minimum processing time for a UL CI may be given by one of values (e.g., $T_{proc,2}$ stated in 3GPP TS 38.214) included in minimum processing time capability for a PUSCH of an SCS configuration of a DL BWP in which the UE receives a PDCCH with the UL CI. The UE may report whether a certain processing time (type 1 processing time and/or type 2 processing time) is available for each SCS configuration to the BS, and the BS may configure one of the type 1 and type 2 processing times to the UE. For example, the UE and the BS may use a PUSCH processing time available by the UE among SCS values of a DL BWP in which a PDCCH is received and may use one of the type 1 and type 2 processing times when both of the type 1 and type 2 processing times are available. In order for different UEs to have the same timing gap, the minimum processing time for the UL CI may be used as a timing gap between an ending symbol of PDCCH CORESET and the beginning of the reference time region.

When UL CI signaling is group-common, it may not be necessary to configure different offsets for different UEs. In the case of assumption of SCS for driving a minimum processing time (e.g., a value of $T_{proc,2}$) for a UL CI, there is no transmission preparation, and thus it may be reasonable to consider only the SCS of the DL BWP carrying the UL CI. When the UE considers DL and UL numerologies for a PUSCH/PUCCH, different UEs having UL BWPs of different numerologies may have different timing gaps between an ending symbol of PDCCH CORESET and start of the reference time region, thereby causing redundant cancellation.

<Implementation B7-1> A minimum processing time for a UL CI and a timing gap between an ending symbol of PDCCH CORESET and start of a reference time region may be determined using the smallest value among SCSs provided together by a plurality of UEs that receive the same UL CI.

UEs in a cell may recognize information on SCSs available in the cell through frequencyInfoUL of UplinkConfigCommonSIB IE that is commonly received through RRC signaling of the BS, that is, an RRC parameter received through FrequencyInfoUL-SIB IE (refer to 3GPP TS 38.331). In addition, UEs that receive the same UL CI may receive the same PDCCH, and thus SCSs of DL BWPs in which the UL CI is received may be the same.

In some implementations of the present disclosure, in order to determine the size or length of the time and/or frequency domain of the reference resource region used in the UL CI, the smallest SCS among these SCSs may be selected. In detail, a smaller value of the SCS configured through FrequencyInfoUL-SIB IE and SCSs of a PDCCH on which the UL CI is received may be used to assume a processing time of the UL CI. For example, for a serving cell, the UE may determine the first symbol of a reference UL resource for the UL CI to be the first symbol that is after $T_{proc,2}$+d from the end of reception of a PDCCH in which the UE detects the UL CI, where d may be provided according to delta offset d. The delta offset d may be provided to the UE through RRC signaling of the BS. $T_{proc,2}$ may correspond to PUSCH processinAg capability 2 assuming $d_{2,1}$=0 with u being the smallest SCS configuration among SCSs provided by the FrequencyInfoUL-SIB and a SCS of an active DL BWP for monitoring a PDCCH for UL CI detection for a serving cell by the UE is assumed.

Alternatively, the BS may explicitly indicate one of the SCSs to be used in assumption of a UL CI processing time through an RRC parameter. Thus, a SCS to be used may be directly configured, or whether to use a smallest SCS among the SCSs included in the FrequencyInfoUL-SIB or a SCS of a DL BWP in which the UL CI is received may be configured. In other words, the BS may directly/indirectly configure a set of SCSs for the UL CI to the UE and the UE may select the smallest SCS thereamong.

Accordingly, the UE and the BS may select the smallest possible SCS, and thus the UE may ensure a sufficient UL CI processing time, thereby lowering UE implementation difficulty.

<Implementation B8> When the UL CI indicates a certain time and/or frequency resource region, and in more detail, when the UL CI indicates a part of a certain reference resource region, the length of the reference resource region, in particular, the length in the time domain may be determined as a period or an interval of UL CI MOs or an integer multiple of the period or the interval. Thus, one UL CI may use a resource of an interval of UL CI MOs or more as a reference resource region, and thus UL CI(s) may indicate an entire resource region available by the UE.

When the UL CI MOs are determined through a search space configuration of an existing system, it may be difficult to specify an interval of the UL CI MOs. A MO configured through a search space configuration included in RRC configuration information is determined according to a monitoring pattern in one slot and a period of a slot-level, and thus when a plurality of UL CI MOs is configured in one slot, intervals between the UL CIs may not be the same. Accordingly, in this case, in order to determine an interval or a period of UL CI MOs, the following method may be considered.

An actually configured UL CI interval may be disregarded, and an interval between MOs of the UL CI may be determined as a search space period (e.g., a value of monitoringSlotPeriodicityAndOffset in SearchSpace IE). In order to effectively use this method, when a search space period is greater than 1, it may be assumed that only one UL CI MO is configured in a slot. In other words, it may be assumed that two or more UL CI MOs are not configured in one slot.

An interval of UL CI MOs may be determined as an average of actually configured UL CI interval. For example, when N UL CI MOs are configured in one slot, N different intervals may be configured for the respective UL CI MOs, and in this case, a period/interval for determining the reference resource region may be an average of the intervals.

<Implementation B9> When the UL CI indicates a certain time and/or frequency resource region, and in more detail, when the UL CI indicates a part of a certain reference resource region, the length of the reference resource region, in particular, the length in the time domain may be different for each UL CI MO. Accordingly, when different UL CI MOs are spaced apart at irregular intervals, an entire UL resource region may be effectively represented through UL CI(s). In this case, in order to determine length of the UL CI reference resource region or the reference resource region, at least one method of the following may be considered.

The length of a reference resource region of a UL CI transmitted in a certain UL CI MO may be determined as an interval to a next UL CI MO from the corresponding UL CI MO or a integer multiple of the corresponding interval. For example, an interval from a start or last symbol of a CORESET in which a certain UL CI MO is received to a start or last symbol of a CORESET in which a next UL CI MO is transmitted or an integer multiple of the corresponding interval may be determined as the reference resource region or the length of the reference resource region. In this case, the following UL CI MO may be determined using the following method.

Option 1: A UL CI MO that is the closest to (i.e., the first one in time after) a corresponding UL CI MO among available UL CI MOs in consideration of a TDD configuration (e.g., TDD-UL-DL-Configdedicated and TDD-UL-DL-Configcommon) and a slot format indication, transmitted by the BS may be determined as the next UL CI MO. Accordingly, in consideration of a UL CI MO in which actual reception of the UE occurs, each UL CI MO(s) may represent an entire UL resource region.

Option 2: A UL CI MO that is the closest to (i.e., the first one in time after) a corresponding UL CI MO among available UL CI MOs in consideration of a TDD configuration (e.g., TDD-UL-DL-Configdedicated and TDD-UL-DL-Configcommon) transmitted by the BS may be determined as the next UL CI MO. Accordingly, the reference resource region may be determined semi-statically.

Option 3: A UL CI MO that is the closest to (i.e., the first one in time after) a corresponding UL CI MO among available UL CI MOs in consideration of a cell-common TDD configuration (e.g., TDD-UL-DL-Configcommon) transmitted by the BS may be determined as the next UL CI MO. Thus, a group of UEs for monitoring the UL CI may have the same reference resource region or reference resource region length.

The length of the reference resource region of the UL CI received in a certain UL CI MO may be determined as a search space period (e.g., a value of monitoringSlotPeriodicityAndOffset in SearchSpace IE) or integer N times of the corresponding time length. In this case, N may be determined using the following method.

Option 1: In consideration of a TDD configuration (e.g., TDD-UL-DL-Configdedicated and TDD-UL-DL-Configcommon) and a slot format indication, transmitted by the BS, the number of non-available UL CI MOs (e.g., overlapping a UL symbol) to a next UL CI MO in which transmission is possible or the number of slots in which a UL CI MO is configured but an available UL CI MO (e.g., in a DL symbol) is not present may be determined as N. Accordingly, in consideration of a UL CI MO in which actual reception of the UE occurs, the UL CI MO(s) may represent an entire resource region.

Option 2: In consideration of a TDD configuration (e.g., TDD-UL-DL-Configdedicated and TDD-UL-DL-Configcommon) transmitted by the BS, the number of non-available UL CI MOs (e.g., overlapping a UL symbol) to a next UL CI MO in which transmission is possible or the number of slots in which a UL CI MO is configured but an available UL CI MO (e.g., in a DL symbol) is not present may be determined as N. Accordingly, the reference resource region may be determined semi-statically.

Option 3: In consideration of a cell-common TDD configuration (e.g., TDD-UL-DL-Configcommon) transmitted by the BS, the number of non-available UL CI MOs (e.g., overlapping a UL symbol) to a next UL CI MO in which reception is possible or the number of slots in which a UL CI MO is configured but an available UL CI MO (e.g., in a DL symbol) is not present may be determined as N. Thus, a group of UEs for monitoring the UL CI may have the same reference resource region or reference resource region length.

Figure 13:
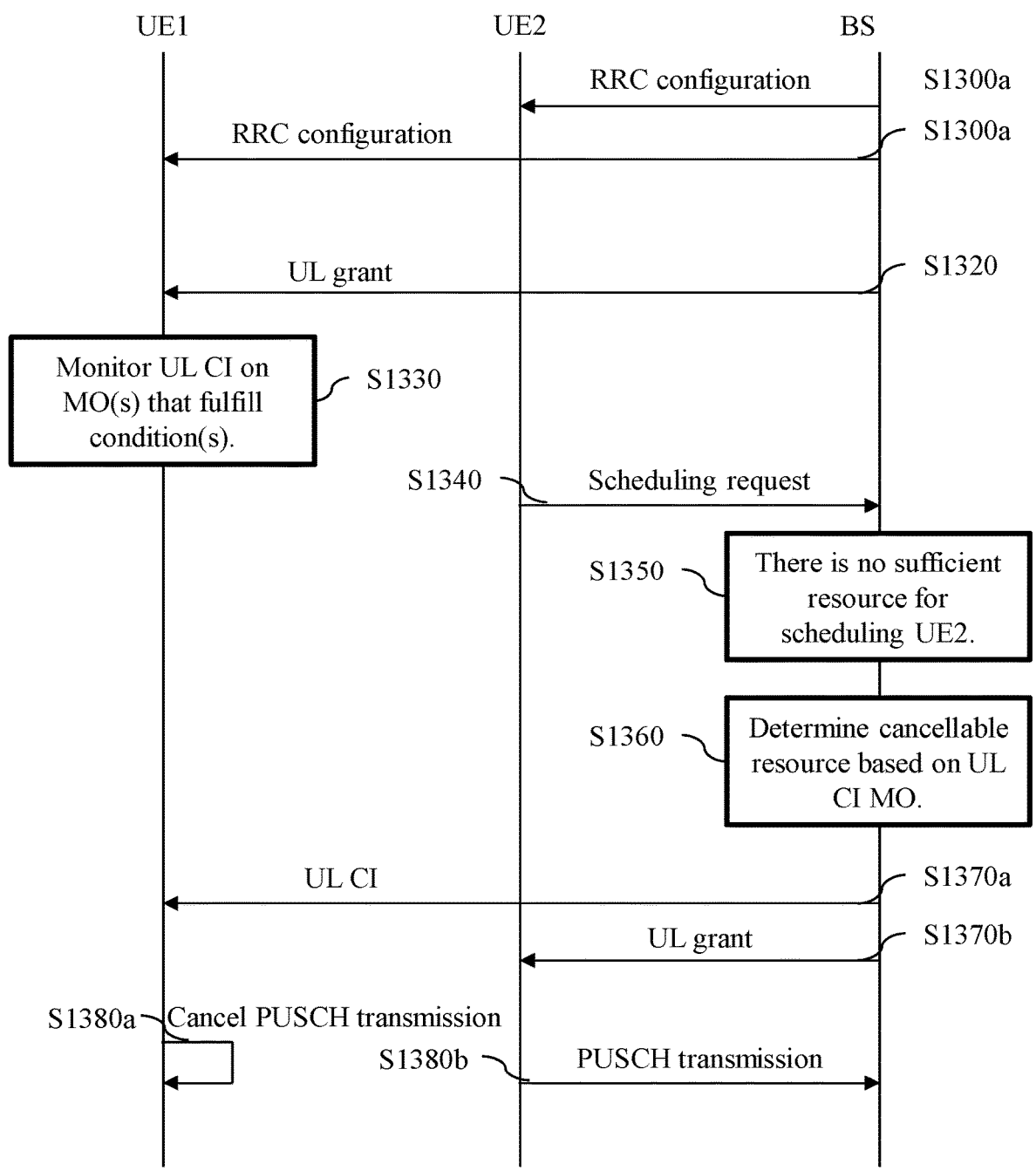
FIG. 13 illustrates an example of a signaling flow between UEs and a BS according to some implementations of the present disclosure.

FIG. 13 illustrates an example of a signaling flow between UEs and a BS according to some implementations of the present disclosure.

The UE may report UE capability information related to a processing time of a data channel (e.g., a PUSCH) to the BS. The BS may provide configuration information related to PDCCH monitoring in consideration UE capability to the UE and may transmit a DL channel. The UE may perform PDCCH monitoring based on the configuration information to receive/decode a PDCCH.

As exemplified in FIG. 13, information may be exchanged between the UE and the BS. The BS may configure a scheduling request (SR) resource to a UE2 and may configure MO(s) for UL CI monitoring to a UE1 through a RRC configuration (S1300*a* and S1300*b*). Then, when UL transmission of a PUSCH, a PUCCH, or the like is configured or indicated to the UE1 (S1320), the UE1 may expect UL CI reception only in a specific MO that satisfies a condition (S1330). When the BS receives a scheduling request from the UE2 (S1340), if there is no sufficient resource (S1350), the BS may determine a cancellable UL resource among UL resources pre-allocated to the UE1 in consideration of the UL CI MO of the UE1 (S1360). The BS may transmit the UL CI to the UE1 to cancel UL transmission in a cancellable resource (S1370*a*) and may schedule UL transmission of the UE2 through a scheduling message such as a UL grant (S1370*b*). The UE1 may cancel all or some of UL transmission scheduled to the UE1 based on the UL CI (S1380*a*). The UE2 may perform UL transmission based on the received UL grant (S1380*b*). In some implementations of the present disclosure, the UE1 may be an eNBB UE, and the UE2 may be a URLLC UE.

According to implementations of the present disclosure, the BS and the UE may determine a PDCCH MO for an appropriate UL CI and may expect to transmit and receive a UL CI only in a MO that satisfies a specific condition. According to some implementations of the present disclosure, the BS may minimize redundant UL CI transmission to reduce power consumption and PDCCH overhead and may additionally increase service availability. According to some implementations of the present disclosure, the UE may minimize redundant UL CI monitoring to reduce power consumption and to ensure a processing time for another operation. In addition, UE implementation may be facilitated.

Implementations of the present disclosure may be separately applied or at least one implementation may be combined and applied.

The UE may perform operations related to UL transmission according to some implementations of the present disclosure. The UE may include at least one transceiver, at least one processor, and at least one computer memory operatively connectable to the at least one processor, and storing instructions that when executed causes the at least one processor to perform operations. A processing device for the UE may include at least one processor and at least one computer memory operatively connectable to the at least one processor, and storing instructions that when executed causes the at least one processor to perform operations. A computer readable storage medium may store at least one computer program that includes instructions that, when executed by at least one processor, causes the at least one processor to perform operations. The operations may include receiving a configuration related to a physical downlink control channel (PDCCH) monitoring occasion (MO) for UL CI reception, receiving scheduling information for a uplink transmission (UL) transmission, and performing or skipping, in the PDCCH MO, UL CI monitoring for the UL transmission based on the configuration and the scheduling information. The performing or skipping, in the PDCCH MO, the UL CI monitoring for the UL transmission may include, based on the UL transmission overlapping at least in time with a reference resource region to be indicated by a UL CI received in the PDCCH MO, performing, in the PDCCH MO, the UL CI monitoring for the UL transmission. The performing or skipping, in the PDCCH MO, the UL CI monitoring for the UL transmission may include, based on the UL transmission not overlapping in time with the reference resource region, skipping, in the PDCCH MO, the UL CI monitoring for the UL transmission.

In some implementations of the present disclosure, the operations may further include detecting the UL CI for the UL transmission based on performing the UL CI monitoring, and based on the detecting the UL CI, canceling the UL transmission in a resource indicated by the UL CI among resources of the UL transmission.

In some implementations of the present disclosure, the reference resource region may include Y symbols in a time domain, and a first symbol among the Y symbols is a first symbol that is after X symbols from an end of the PDCCH MO, X being a predefined value and Y being determined based on the configuration.

The scheduling information may be received prior to the reference resource region in a time domain.

A BS may transmit a scheduling information is received prior to the reference resource region in a time domain. The BS may include at least one transceiver, at least one processor, and at least one computer memory operatively connectable to the at least one processor, and storing instructions that when executed causes the at least one processor to perform operations. A processing device for the BS may include at least one processor and at least one computer memory operatively connectable to the at least one processor, and storing instructions that when executed causes the at least one processor to perform operations. A computer readable storage medium may store at least one computer program that includes instructions that, when executed by at least one processor, causes the at least one processor to perform operations. The operations may include transmitting a configuration related to a physical downlink control channel (PDCCH) monitoring occasion (MO) for UL CI transmission, transmitting scheduling information for a uplink transmission (UL) transmission to a user equipment, and based on the configuration and the scheduling information, performing or skipping transmission of the UL CI for the UL transmission in the PDCCH MO. The performing or skipping the transmission of the UL CI for the UL transmission may include, based on the UL transmission overlapping at least in time with a reference resource region to be indicated by the UL CI transmitted in the PDCCH MO, performing, in the PDCCH MO, transmission of the UL CI for the UL transmission. The performing or skipping the transmission of the UL CI for the UL transmission may include, based on the UL transmission not overlapping in time with the reference resource region, skipping, in the PDCCH MO, the transmission of the UL CI for the UL transmission.

In some implementations of the present disclosure, the operations may include transmitting the UL CI for the UL transmission in the PDCCH MO, and based on the transmitting the UL CI, canceling reception of the UL transmission from the UE in a resource indicated by the UL CI among resources of the UL transmission.

In some implementations of the present disclosure, the reference resource region may include Y symbols in a time domain. A first symbol among the Y symbols may be a first symbol that is after X symbols from an end of the PDCCH MO, X being a predefined value and Y being determined based on the configuration.

The scheduling information may be transmitted prior to the reference resource region in a time domain.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL AVAILABILITY

The implementations of the present disclosure may be used in a BS, a UE, or other equipment in a wireless communication system.

The invention claimed is:

1. A method of performing uplink cancelation indication (UL CI) monitoring by a user equipment in a wireless communication system, the method comprising:
receiving a configuration regarding a UL CI, the configuration including information related to a physical downlink control channel (PDCCH) monitoring occasion (MO) for reception of the UL CI and information related to a reference resource region, wherein a part of the reference resource region is indicated by the UL CI;
receiving scheduling information for an uplink (UL) transmission;
based on the PDCCH MO being valid for the UL transmission, performing, in the PDCCH MO, UL CI monitoring for the UL transmission; and
based on detecting the UL CI in the PDCCH MO and based on the UL transmission including a resource that overlaps with a resource determined to be canceled based on the UL CI, canceling the UL transmission in the overlapping resource, wherein the PDCCH MO is determined to be valid for the UL transmission, at least based on i) the reference resource region overlapping at least in time with the resource of the UL transmission and ii) the UL transmission being a transmission with a low priority.

2. The method according to claim 1, wherein a first symbol of the reference resource region is a first symbol that is after a time gap X from an end of the PDCCH MO, where the time gap X is a minimum processing time for a physical uplink shared channel (PUSCH) of a subcarrier spacing (SCS) configuration of a downlink bandwidth part where the user equipment receives a PDCCH with the UL CI.

3. The method according to claim 1, wherein the scheduling information is received prior to the reference resource region in a time domain.

4. The method according to claim 2, wherein the time gap X is obtained from T_proc,2+d, where d is provided by a radio resource control (RRC) signaling, and T_proc,2 is a minimum processing time for PUSCH processing capability 2 with a smallest SCS configuration among SCSs provided in a system information block (SIB) and the SCS configuration of the downlink bandwidth part where the user equipment monitors a PDCCH for UL CI detection on a serving cell.

5. The method according to claim 1, wherein canceling the UL transmission in the overlapping resource comprises:
based on a forepart of the UL transmission having a demodulation reference signal (DMRS) symbol not included in the overlapping resource, transmitting the forepart of the UL transmission.

6. A user equipment for performing uplink cancelation indication (UL CI) monitoring in a wireless communication system, the user equipment comprising:
at least one transceiver;
at least one processor; and
at least one computer memory operatively connectable to the at least one processor, and storing instructions that when executed causes the at least one processor to perform operations comprising:
receiving a configuration regarding a UL CI, the configuration including information related to a physical downlink control channel (PDCCH) monitoring occasion (MO) for reception of the UL CI and information related to a reference resource region,
wherein a part of the reference resource region is indicated by the UL CI;
receiving scheduling information for an uplink transmission (UL) transmission; and
based on the PDCCH MO being valid for the UL transmission, performing, in the PDCCH MO, UL CI monitoring for the UL transmission; and
based on detecting the UL CI in the PDCCH MO and based on the UL transmission including a resource that overlaps with a resource determined to be canceled based on the UL CI, canceling the UL transmission in the overlapping resource,
wherein the PDCCH MO is determined to be valid for the UL transmission, at least based on i) the reference resource region overlapping at least in time with the resource of the UL transmission and ii) the UL transmission being a transmission with a low priority.

7. The user equipment according to claim 6, wherein a first symbol of the reference resource region is a first symbol that is after a time gap X from an end of the PDCCH MO, where the time gap X is a minimum processing time for a physical uplink shared channel (PUSCH) of a subcarrier spacing (SCS) configuration of a downlink bandwidth part where the user equipment receives a PDCCH with the UL CI.

8. The user equipment according to claim 7, wherein the time gap X is obtained from T_proc,2+d, where d is provided by a radio resource control (RRC) signaling, and T_proc,2 is a minimum processing time for PUSCH processing capability 2 with a smallest SCS configuration among SCSs provided in a system information block (SIB) and the SCS configuration of the downlink bandwidth part where the user equipment monitors a PDCCH for UL CI detection on a serving cell.

9. The user equipment according to claim 6, wherein the scheduling information is received prior to the reference resource region in a time domain.

10. The user equipment according to claim 6, wherein canceling the UL transmission in the overlapping resource comprises:
based on a forepart of the UL transmission having a demodulation reference signal (DMRS) symbol not included in the overlapping resource, transmitting the forepart of the UL transmission.

11. A method of transmitting uplink cancelation indication (UL CI) by a base station in a wireless communication system, the method comprising:
transmitting a configuration regarding the UL CI, the configuration including information related to a physical downlink control channel (PDCCH) monitoring occasion (MO) for transmission of the UL CI and information related to a reference resource region,
wherein a part of the reference resource region is indicated by the UL CI;
transmitting scheduling information for an uplink (UL) transmission to a user equipment;
based on the PDCCH MO being valid for the UL transmission, performing, in the PDCCH MO, transmission of the UL CI for the UL transmission; and
based on transmitting the UL CI in the PDCCH MO and based on the UL transmission including a resource that overlaps with a resource to be canceled based on the UL CI, canceling a reception of the UL transmission in the overlapping resource,
wherein the PDCCH MO is determined to be valid for the UL transmission, at least based on i) the reference resource region overlapping at least in time with the resource of the UL transmission and ii) the UL transmission being a transmission with a low priority.

12. The method according to claim 11, wherein a first symbol of the reference resource region is a first symbol that is after a time gap X from an end of the PDCCH MO, where the time gap X is a minimum processing time for a physical uplink shared channel (PUSCH) of a subcarrier spacing (SCS) configuration of a downlink bandwidth part where the user equipment receives a PDCCH with the UL CI.

13. The method according to claim 12, wherein the time gap X is obtained from T_proc,2+d, where d is provided by a radio resource control (RRC) signaling, and T_proc,2 is a minimum processing time for PUSCH processing capability 2 with a smallest SCS configuration among SCSs provided in a system information block (SIB) and the SCS configuration of the downlink bandwidth part where the user equipment monitors a PDCCH for UL CI detection on a serving cell.

14. The method according to claim 11, wherein the scheduling information is transmitted prior to the reference resource region in a time domain.

15. The method according to claim 11, wherein canceling the reception of the UL transmission in the overlapping resource comprises:
- based on a forepart of the UL transmission having a demodulation reference signal (DMRS) symbol not included in the overlapping resource, receiving the forepart of the UL transmission.

* * * * *